(12) United States Patent
Bassin et al.

(10) Patent No.: US 8,495,583 B2
(45) Date of Patent: Jul. 23, 2013

(54) SYSTEM AND METHOD TO DETERMINE DEFECT RISKS IN SOFTWARE SOLUTIONS

(75) Inventors: Kathryn A. Bassin, Endicott, NY (US); Howard M. Hess, Chicago, IL (US); Sheng Huang, Shanghai (CN); Steven Kagan, Oakbrook Terrace, IL (US); Shao C. Li, Beijing (CN); Zhong J. Li, Beijing (CN); He H. Liu, Beijing (CN); Susan E. Skrabanek, Atlanta, GA (US); Hua F. Tan, Beijing (CN); Jun Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 985 days.

(21) Appl. No.: 12/558,147

(22) Filed: Sep. 11, 2009

(65) Prior Publication Data
US 2011/0067005 A1 Mar. 17, 2011

(51) Int. Cl.
G06F 9/44 (2006.01)
G06F 11/34 (2006.01)

(52) U.S. Cl.
CPC .................................. *G06F 11/3466* (2013.01)
USPC ........................................... 717/127; 717/124

(58) Field of Classification Search
None
See application file for complete search history.

(56) References Cited

U.S. PATENT DOCUMENTS

| | | | |
|---|---|---|---|
| 5,539,652 A | 7/1996 | Tegethoff | |
| 5,905,856 A | 5/1999 | Ottensooser | |
| 6,332,211 B1 | 12/2001 | Pavela | |
| 6,442,748 B1 | 8/2002 | Bowman-Amuah | |
| 6,456,506 B1 | 9/2002 | Lin | |
| 6,477,471 B1 | 11/2002 | Hedstrom et al. | |
| 6,519,763 B1 | 2/2003 | Kaufer et al. | |
| 6,546,506 B1 | 4/2003 | Lewis | |
| 6,601,233 B1 | 7/2003 | Underwood | |
| 6,725,399 B1 | 4/2004 | Bowman | |
| 6,889,167 B2 | 5/2005 | Curry | |
| 6,901,535 B2 | 5/2005 | Yamauchi et al. | |
| 6,988,055 B1 | 1/2006 | Rhea et al. | |
| 7,200,775 B1 | 4/2007 | Rhea et al. | |
| 7,231,549 B1 | 6/2007 | Rhea et al. | |
| 7,334,166 B1 | 2/2008 | Rhea et al. | |
| 7,451,009 B2 | 11/2008 | Grubb et al. | |
| 7,788,647 B2 | 8/2010 | Martin et al. | |
| 7,809,520 B2 | 10/2010 | Adachi | |
| 7,861,226 B1 | 12/2010 | Episkopos et al. | |

(Continued)

OTHER PUBLICATIONS

Notice of Allowance dated Aug. 31, 2012 in U.S. Appl. No. 12/558,375.

(Continued)

*Primary Examiner* — Henry W. H. Tsai
*Assistant Examiner* — Christopher Bartels
(74) *Attorney, Agent, or Firm* — Matthew Chung; Roberts Mlotkowski Safran & Cole, P.C.

(57) ABSTRACT

A method is implemented in a computer infrastructure having computer executable code tangibly embodied on a computer readable storage medium having programming instructions. The programming instructions are operable to receive one or more risk factors, receive one or more contexts, identify one or more context relationships and associate the one or more contexts with the one or more risk factors. Additionally, the programming instructions are operable to map the one or more risk factors for an associated context to a software defect related risk consequence to determine a risk model and execute a risk-based testing based on the risk model to determine a defect related risk evaluation for a software development project.

24 Claims, 15 Drawing Sheets

U.S. PATENT DOCUMENTS

| | | | |
|---|---|---|---|
| 7,886,272 | B1 | 2/2011 | Episkopos et al. |
| 7,984,304 | B1 | 7/2011 | Waldspurger et al. |
| 2001/0052108 | A1 | 12/2001 | Bowman-Amuah |
| 2003/0018952 | A1 | 1/2003 | Roetzheim |
| 2003/0033191 | A1* | 2/2003 | Davies et al. ............... 705/10 |
| 2003/0070157 | A1* | 4/2003 | Adams et al. ............. 717/101 |
| 2003/0196190 | A1 | 10/2003 | Ruffolo et al. |
| 2004/0205727 | A1 | 10/2004 | Sit et al. |
| 2004/0267814 | A1 | 12/2004 | Ludwig et al. |
| 2005/0071807 | A1 | 3/2005 | Yanavi |
| 2005/0114828 | A1 | 5/2005 | Dietrich et al. |
| 2005/0209866 | A1 | 9/2005 | Veeningen et al. |
| 2005/0283751 | A1 | 12/2005 | Bassin et al. |
| 2006/0248504 | A1 | 11/2006 | Hughes |
| 2006/0251073 | A1 | 11/2006 | Lepel et al. |
| 2006/0265188 | A1 | 11/2006 | French et al. |
| 2007/0100712 | A1* | 5/2007 | Kilpatrick et al. .......... 705/29 |
| 2007/0112879 | A1 | 5/2007 | Sengupta |
| 2007/0174023 | A1 | 7/2007 | Bassin et al. |
| 2007/0234294 | A1 | 10/2007 | Gooding |
| 2007/0283325 | A1 | 12/2007 | Kumar |
| 2007/0283417 | A1* | 12/2007 | Smolen et al. ................ 726/2 |
| 2008/0010543 | A1 | 1/2008 | Yamamoto et al. |
| 2008/0052707 | A1 | 2/2008 | Wassel et al. |
| 2008/0072328 | A1* | 3/2008 | Walia et al. ................. 726/25 |
| 2008/0092108 | A1* | 4/2008 | Corral ........................ 717/101 |
| 2008/0092120 | A1 | 4/2008 | Udupa et al. |
| 2008/0178145 | A1 | 7/2008 | Lindley |
| 2008/0201611 | A1 | 8/2008 | Bassin et al. |
| 2008/0201612 | A1 | 8/2008 | Bassin et al. |
| 2008/0255693 | A1 | 10/2008 | Chaar et al. |
| 2009/0070734 | A1 | 3/2009 | Dixon et al. |
| 2010/0005444 | A1 | 1/2010 | McPeak |
| 2010/0145929 | A1 | 6/2010 | Burger et al. |
| 2010/0211957 | A1* | 8/2010 | Lotlikar et al. ............. 718/104 |
| 2010/0275263 | A1* | 10/2010 | Bennett et al. ............. 726/25 |
| 2010/0332274 | A1* | 12/2010 | Cox et al. ..................... 705/7 |
| 2011/0296371 | A1 | 12/2011 | Marella |
| 2012/0017195 | A1 | 1/2012 | Kaulgud et al. |
| 2012/0053986 | A1* | 3/2012 | Cardno et al. ............ 705/7.29 |

OTHER PUBLICATIONS

Office Action dated Apr. 27, 2012 in U.S. Appl. No. 12/558,375.

Hurlbut, "Managing Domain Architecture Evolution Through Adaptive Use Case and Business Rule Models", 1997, pp. 1-42.

Office Action dated Nov. 5, 2012 in U.S. Appl. No. 12/558,274, 12 pages.

Office Action dated Oct. 11, 2012 in U.S. Appl. No. 12/558,327, 12 pages.

Office Action dated Nov. 8, 2012 in U.S. Appl. No. 12/558,260, 17 pages.

Office Action dated Nov. 8, 2012 in U.S. Appl. No. 13/595,148, 14 pages.

McGarry, J. et al., "Practical Software Measurement: A Guide to Objective Program Insight", http://pdf.aminer.org/000136 1/576/practical_software_measurement.pdf, Naval Undersea Warfare Center, Version 2.1, Part 1 to Part 4, 1996, 299 pages.

Jonsson, G., "A Case Study into the Effects of Software Process Improvement on Product Quality", Jun. 2004, Master's Tesis in Computer Science—University of Iceland, 93 pages.

Office Action dated Nov. 23, 2012 in U.S. Appl. No. 12/558,263, 36 pages.

Kwinkelenberg, R. et al., "Smartesting for Dummies", Oct. 14, 2008, Wiley, 36 pages.

Lazic, L. et al., "Cost Effective Software Test Metrics", WSEAS Transactions on Computers, Issue 6, vol. 7, Jun. 2008, pp. 599-619.

Hou, R. et al., Optimal Release Times for Software Systems with Scheduled Delivery Time Based on the HGDM, IEEE Transactions on Computers, vol. 46, No. 2, Feb. 1997, pp. 216-221.

Final Office Action dated Nov. 23, 2012 in U.S. Appl. No. 12/557,886, 42 pages.

Boehm, B., "Software Engineering Economics", IEEE Transactions on Software Engineering, vol. SE-19, No. 1, Jan. 1984, pp. 4-21.

Basili, V. et al., "Comparing the Effectiveness of Software Testing Strategies", IEEE Transactions on Software Engineering, vol. SE-13, No. 12, Dec. 1987, pp. 1278-1296.

Office Action dated Oct. 5, 2012 in U.S. Appl. No. 12/557,816, 13 pages.

Holden, I. et al., "Imporoving Testing Efficiency using Cumulative Test Analysis", Proceedings of the Testing: Academic & Idustrial conference—Practice and Research Techniques, IEEE, 2006, pp. 1-5.

Holden, I., "Improving Testing Efficiency using Cumulative Test Analysis", 2006, 25 slices, retrieved from www2006.taicpart.org/presentations/session5/3.pdf, pp. 1-25.

Ponaraseri, S. et al., "Using the Game for Test Case Prioritization", retrieved from selab.fbk.eu/tonella/papers/issre2008.pdf, pp. 1-10.

Tonella, P., "Publication List", 2012, retrieved from //selab.fbk.eu/tonella/papersbyyear.html, 15 pages.

Office Action dated Jun. 14, 2012 in U.S. Appl. No. 12/557,886, 38 pages.

Ambler. S., "Choosing the Right Software Method for the Job", web.archive.org/web/20090219074845agilledata.org/essays/differentStrategies.html, retrieved Jun. 7, 2012, pp. 1-14.

Unknown, "ASTQB—ISTQB Software Testing Certification : ISTQB Syllabi", //web.archive.orb/web/20090423053623/astqb.org/educational-resources/syllabi-management5.php, retrieved Jun. 7, 2012, pp. 1-12.

Office Action dated Oct. 3, 2012 in U.S. Appl. No. 12/558,382, 11 pages.

Office Action dated Dec. 7, 2012 in U.S. Appl. No. 12/558,324, 15 pages.

Office Action dated Apr. 13, 2012 in U.S. Appl. No. 12/558,324, 10 pages.

* cited by examiner

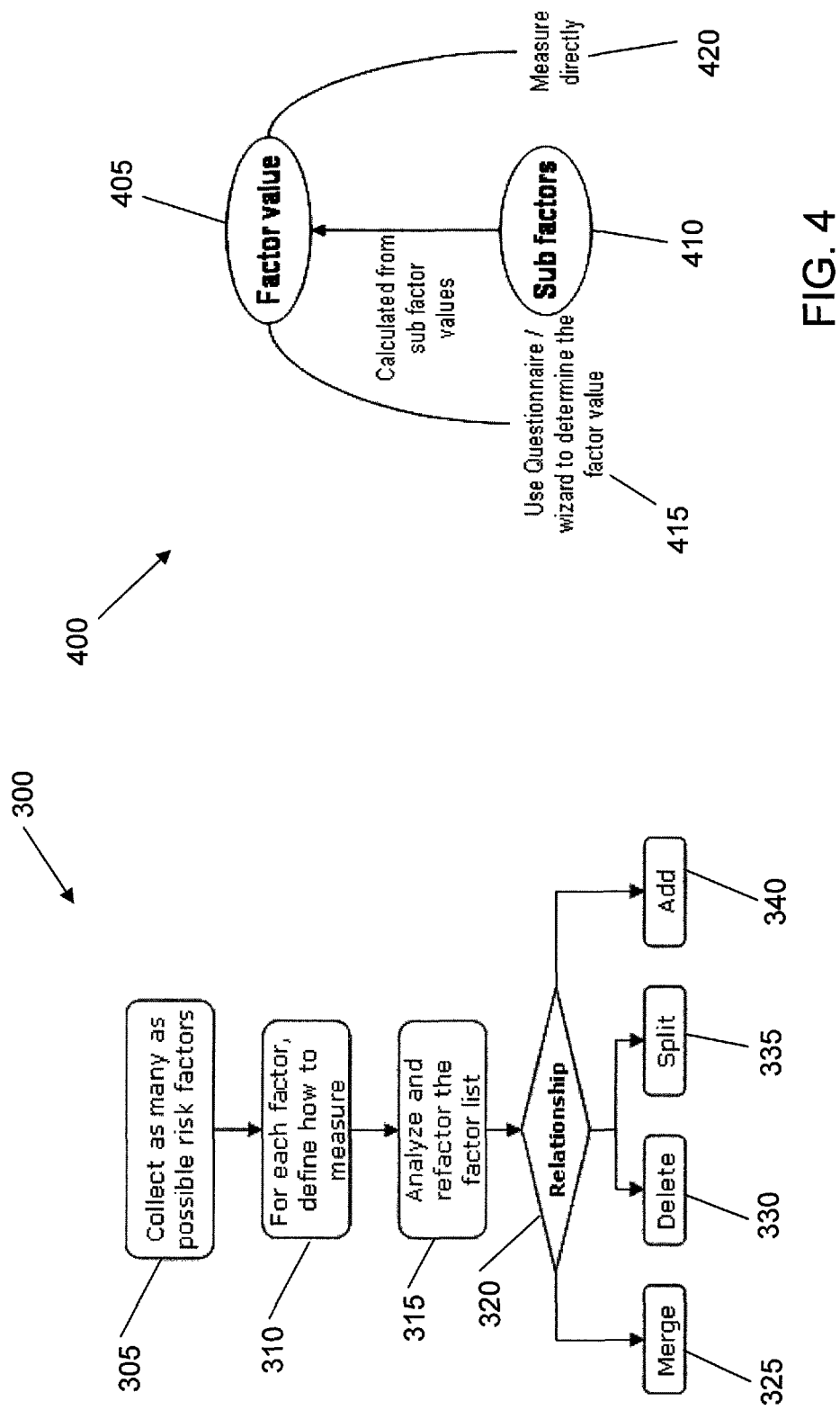

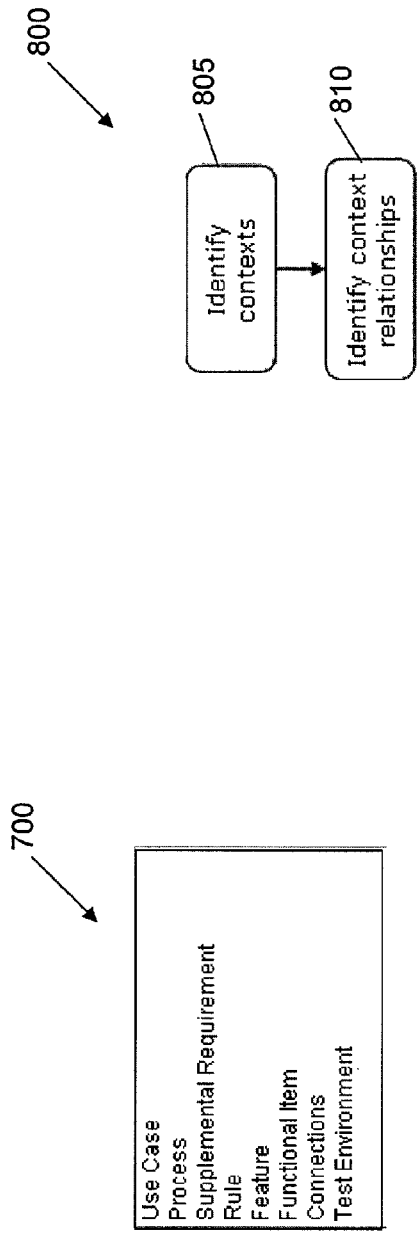
FIG. 7
FIG. 8
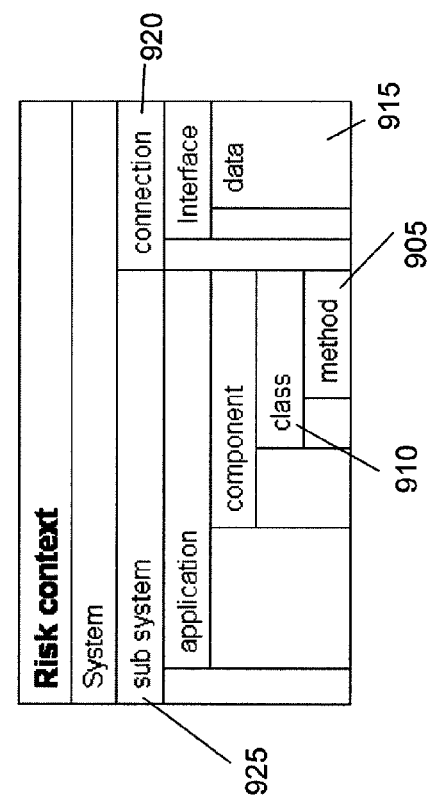
FIG. 9

| Risk factor | | Sub factors | Risk context | | | | | | | |
|---|---|---|---|---|---|---|---|---|---|---|
| | | | IT System | | | | Business Features | | Risk Dimensions | |
| | | | applications | sub-system | component | class / method | Connections | Use case / Process / Functions | Failure possibility | Failure damage |
| Business | Business Criticality | | | | | | | | | ✓ |
| | Usage Frequency | | | | | | | | | ✓ |
| | Requirement Stability | Change frequency, Defect density | | | | | | | ✓ | ✓ |
| | Business Complexity | Cyclomatic Complexity | | | | | | | ✓ | |
| Technical | Application Popularity | Number of downloads/installations | | | | | | ✓ | ✓ | ✓ |
| | Application Maturity | Application defect density | | | | | | | ✓ | ✓ |
| | Application Complexity | App size, Interface num | | | | | | | ✓ | |
| | Connection Criticality / Global transaction | | | | | | ✓ | | ✓ | |
| | Connection Complexity / Cross platform | | | | | | ✓ | | ✓ | |
| | / Data transformation | | | | | | ✓ | | ✓ | |
| | / 3rd party integration | | | | | | ✓ | | ✓ | |
| | / New protocol | | | | | | ✓ | | ✓ | |
| PM | Team Development Skill | | | | | | | | ✓ | |
| | Team Development Process | | | | | | | | ✓ | |
| | Development Time Pressure | | | | | | | | ✓ | |

| Area to test | Failure damage factors | | Failure possibility factors | | RISK |
|---|---|---|---|---|---|
| | Business criticality | Visibility | Complexity | Change frequency | |
| Weight | 3 | 2 | | | |
| Order registration | 2 | 10 | 3 | 3 | |
| Invoicing | 4 | 4 | 5 | 1 | 46*18 |
| Order statistics | 2 | 5 | 4 | 2 | 62*18 |
| | | 1 | 3 | 3 | 16*18 |

| Test Activities | High level requirement or design review | Detailed requirement or design review | Code review | Unit test | System test | System integration test | User acceptance test |
|---|---|---|---|---|---|---|---|
| Test design reference | Client needs and features | High level requirements or design | Detailed requirement or design, Code | Detailed requirement or design, Code | Application requirement | System requirement, Design | Client needs and features, requirements |
| Artifacts under test | High level requirement or design | Detailed requirement or design | Code | Code | Application | System | System |

1300, 1305, 1310, 1315

SYSTEM AND METHOD TO DETERMINE DEFECT RISKS IN SOFTWARE SOLUTIONS

CROSS REFERENCE TO RELATED APPLICATIONS

The present invention is related to copending U.S. application Ser. No. 12/558,260, filed on Sep. 11, 2009; the contents of which are incorporated herein in their entireties by reference.

FIELD OF THE INVENTION

The present invention generally relates to a system and method of defect analysis, and more particularly, to a method and system to determine defect risks in software solutions.

BACKGROUND

While software systems continue to grow in size and complexity, business demands continue to require shorter development cycles. This has led software developers to compromise on functionality, time to market, and quality of software products. Furthermore, the increased schedule pressures and limited availability of resources and skilled labor can lead to problems such as incomplete design of software products, inefficient testing, poor quality, high development and maintenance costs, and the like. This may lead to poor customer satisfaction and a loss of market share for companies developing software.

To improve product quality, many organizations devote an increasing share of their resources to testing and identifying problem areas related to software and the process of software development. Accordingly, it is not unusual to include a quality assurance team in software development projects to identify defects in the software product during and after development of a software product. By identifying and resolving defects before marketing the product to customers, software developers can assure customers of the reliability of their products, and reduce the occurrence of post-sale software fixes such as patches and upgrades which may frustrate their customers.

Software testing may involve verifying the correctness, completeness, security, quality, etc. of a product. During testing, a technical investigation may be performed by, for example, executing a program or application with the intent to find errors. If errors are found, one or more areas in the software code may be identified based on the errors. Therefore, developers may alter the code in the identified regions to obviate the error.

After a defect has been fixed, data regarding the defect, and the resolution of the defect, may be stored in a database. The defects may be classified and analyzed as a whole using, for example, Orthogonal Defect Classification (ODC) and/or a defect analysis starter/defect reduction method (DAS/DRM). ODC is a commonly used complex quality assessment schema for understanding code related defects uncovered during testing.

It is widely accepted in the testing industry that the least expensive defects to fix are those found earliest in the life cycle. However, a problem in complex system integration testing is that there may be very few comprehensive opportunities for projects to remove defects cost effectively prior to late phase testing, and by that point in the life cycle (i.e., late phase testing) defects are relatively expensive to fix. Furthermore, for many projects there are particular kinds of high impact exposures, e.g., defects in the area of security, that are critical to find and fix, but are also difficult to test.

Measuring and predicting defect related risk in a software system is a difficult problem across the testing industry. For example, there are many factors influencing the injection of defects, as well as their impact. Additionally, defect related risk changes dynamically throughout the software life cycle. Project stakeholders could make better decisions if defect related information (e.g., the number, severity, and cost of defects) could be made available to them in a timely way. However, there is no model in the industry capable of predicting the number, severity, and cost of defects.

Accordingly, there exists a need in the art to overcome the deficiencies and limitations described hereinabove.

SUMMARY

In a first aspect of the invention, a method is implemented in a computer infrastructure having computer executable code tangibly embodied on a computer readable storage medium having programming instructions. The programming instructions are operable to receive one or more risk factors, receive one or more contexts, identify one or more context relationships and associate the one or more contexts with the one or more risk factors. Additionally, the programming instructions are operable to map the one or more risk factors for an associated context to a software defect related risk consequence to determine a risk model and execute a risk-based testing based on the risk model to determine a defect related risk evaluation for a software development project.

In another aspect of the invention, a system implemented in hardware comprises a risk factor receiving (RFR) tool operable to receive one or more risk factors and a context receiving (CR) tool operable to receive: one or more contexts, one or more context relationships and associations of the one or more contexts with the one or more risk factors. Additionally, the system comprises a mapping tool operable to map the one or more risk factors for an associated context to a software defect related risk consequence to determine a risk model and a software break-down (SB) tool operable to break-down software into risk evaluation units. Further, the system comprises a risk annotation tool operable to evaluate and annotate a software solution with selected risk factors for the risk evaluation units and a risk-based testing tool operable to execute a risk-based testing on the software based on the risk model to determine a defect related risk evaluation for a software development project and collect test results and a test process from the risk-based testing.

In an additional aspect of the invention, a computer program product comprising a computer usable storage medium having readable program code embodied in the medium is provided. The computer program product includes at least one component operable to receive one or more risk factors. The one or more risk factors comprise an orthogonal list of risk factors, including at least one of technical risk factors, business risk factors, project management risk factors and user-added risk factors and are defined with one or more of a risk factor name, a risk factor category, a requirement type, a description, one or more scale definitions and a risk factor value. Additionally, the at least one component is operable to receive one or more contexts, identify one or more context relationships and associate the one or more contexts with the one or more risk factors. Furthermore, the at least one component is operable to map the one or more risk factors for an associated context to a software defect related risk consequence to determine a risk model and execute a risk-based testing based on the risk model to determine a defect related risk evaluation for a software development project.

In a further aspect of the invention, a computer system for classifying automated code inspection services defect output for defect analysis, the system comprises a CPU, a computer readable memory and a computer readable storage media. Additionally, the system comprises first program instructions to receive one or more risk factors, second program instructions to receive one or more contexts and identify one or more context relationships and third program instructions to associate the one or more contexts with the one or more risk factors. Furthermore, the system comprises fourth program instructions to map the one or more risk factors for an associated context to a software defect related risk consequence to determine a risk model, wherein the mapping the one or more risk factors comprises determining a dimension where the one or more risk factors generates a risk impact. The dimension comprises at least one of a failure possibility dimension, which indicates a likelihood that a defect will occur within a specific context and a failure damage dimension, which indicates a consequence of an occurrence of the defect in production. Additionally, the system comprises fifth program instructions to execute a risk-based testing based on the risk model to determine a defect related risk evaluation for a software development project. The first, second, third, fourth and fifth program instructions are stored on the computer readable storage media for execution by the CPU via the computer readable memory.

BRIEF DESCRIPTION OF THE SEVERAL VIEWS OF THE DRAWINGS

The present invention is described in the detailed description which follows, in reference to the noted plurality of drawings by way of non-limiting examples of exemplary embodiments of the present invention.

FIGS. 2-4 show exemplary flow diagrams in accordance with aspects of the invention;

FIG. 7 shows an exemplary and non-exhaustive list of contexts in the software testing domain in accordance with aspects of the present invention;

FIG. 8 shows an exemplary flow diagram for performing aspects of the present invention;

FIG. 9 illustrates an exemplary hierarchical structure of an IT system used to facilitate a top-down approach to define contexts in accordance with aspects of the invention;

FIG. 10 illustrates an exemplary association table between the example risk factors and the example risk context in accordance with aspects of the invention;

FIG. 12 illustrates an exemplary calculation logic table in accordance with aspects of the present invention;

FIG. 13 shows an exemplary table illustrating the test activities that can be performed, and the related test design reference and artifacts that are the targets under test in accordance with aspects of the present invention;

DETAILED DESCRIPTION

Figure 1:
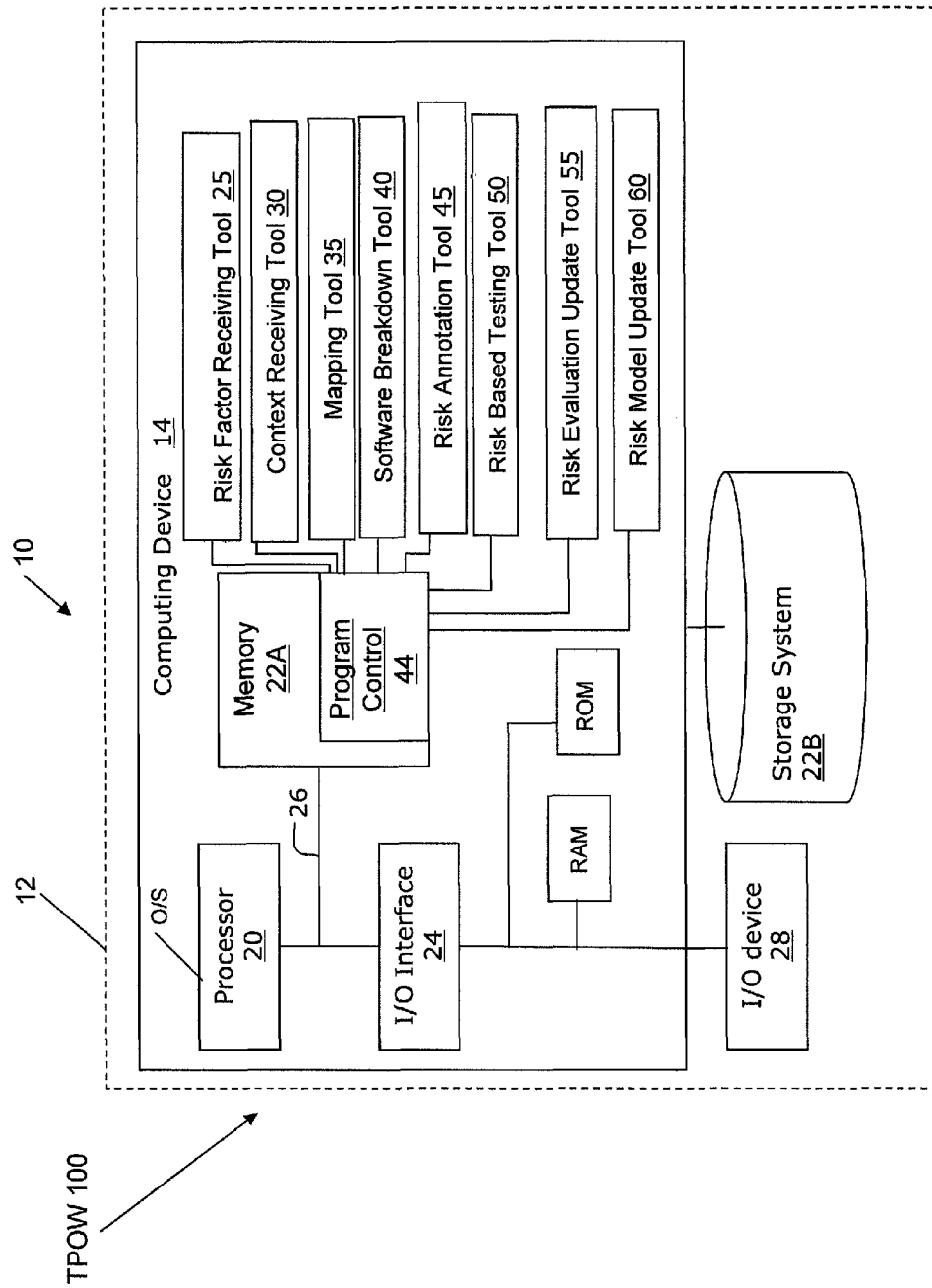
FIG. 1 shows an illustrative environment for implementing the steps in accordance with aspects of the invention.

The present invention generally relates to a method and system of defect analysis, and more particularly, to a method and system to determine defect risks in software solutions. The present invention provides a systematic and disciplined approach for performing software risk evaluation. For example, in embodiments, the present invention provides a method and system to determine defect risks (e.g., a number, severity, and cost of defects) in software solutions based on, e.g., business, technology and/or management drivers. The present invention provides a risk analysis system and method, which is orthogonal, defines risk contexts and associates risk factors with those contexts, and dynamically updates risk as project requirements change with the use of actual test results as feedback to adjust and tune throughout the life cycle.

Conventionally, defect risks may be manually determined based on human experiences. However, this manual approach has drawbacks and limitations. For example, such a manual approach is ad hoc, subjective, and not consistently repeatable. For example, different people may consider different factors from various perspectives, making it very hard to keep a defect risk result consistent and comprehensive absent a guiding model. Additionally, defect risks may be determined using a pre-existing methodology. However, known solutions are both static and flat. For example, known methodologies are static in that they do not define a model for how to adjust a risk evaluation dynamically through the testing life cycle. Additionally, for example, known methodologies are flat in that they only consider risk factors for functions and/or features, whereas testing is performed not only on functions and/or features, but also on code and documentation, and happens on multiple levels of a hierarchical structure. As such, the known methodologies do not consider risk factors for code and documentation, e.g., on multiple levels of a hierarchical structure. Thus, for example, existing methodologies do not provide a comprehensive or adaptable model, leaving a user to produce their own framework for evaluating defect related risk as it continues to change over the project life cycle.

In contrast, the present invention is operable to produce a break-down structure of the software under test, allows a user to map risk factors to different levels of granularity and provides a mechanism for accurately updating risk dynamically. Moreover, the present invention provides a practical solution for evaluating risk (both from a top-down and/or bottom-up perspective) that will support risk based testing at all levels of test, whether it be, for example, unit test (UT) or user acceptance test (UAT), and/or every kind of testing that might occur in between (e.g., system test (ST), system integration test (SIT), etc.). Thus, the present invention is operable to provide a comprehensive and adaptable model.

In embodiments, the present invention provides a partially automated method and system to support the determination and dynamic adjustment of defect related risk. In an exemplary embodiment, the present invention is operable to define risk factors from an orthogonal set of perspectives, (e.g., business, technology, and/or management). Additionally, the present invention is operable to define contexts where such risk factors each can be applied and data can be collected, as well as context relationship (e.g., aggregation, implementation, etc.). Furthermore, the present invention is operable to define a mapping (from risk metrics of contexts) to risk consequences related to defects, as explained below.

Additionally, following one or more stages in the software development life cycle, the present invention is operable to break down the software into risk evaluation units under consideration and evaluate the software solution with the selected risk factors for these units. Additionally, the evaluation is used to do risk based testing. In embodiments, the test process and/or test results may be collected and used as feedback to adjust the risk score and/or update the risk evaluation. Additionally, the present invention is operable to facilitate scrutinization, retrospection and/or improvement of the process, e.g. add and/or delete risk factors/context/mapping.

By implementing the present invention, advantageously risk based testing may be supported in the full test life cycle: e.g., static testing, unit testing, system testing, system integration testing, user acceptance testing, performance testing. Additionally, the present invention provides a standard way to determine defect related risk associated with different orthogonal contexts, which enables consistent, objective and repeatable risk based testing.

System Environment

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following:
- an electrical connection having one or more wires,
- a portable computer diskette,
- a hard disk,
- a random access memory (RAM),
- a read-only memory (ROM),
- an erasable programmable read-only memory (EPROM or Flash memory),
- an optical fiber,
- a portable compact disc read-only memory (CDROM),
- an optical storage device,
- a transmission media such as those supporting the Internet or an intranet, or
- a magnetic storage device.

The computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network. This may include, for example, a local area network (LAN) or a wide area network (WAN), or the connection may be made to an external computer (for example, through the Internet using an Internet Service Provider).

FIG. 1 shows an illustrative environment 10 for managing the processes in accordance with the invention. To this extent, the environment 10 includes a server or other computing system 12 that can perform the processes described herein. In particular, the server 12 includes a computing device 14. The computing device 14 can be resident on a network infrastructure or computing device of a third party service provider (any of which is generally represented in FIG. 1). In embodiments, the environment 10 may be designated as a test planning optimization workbench (TPOW) 100.

The computing device 14 includes a risk factor receiving (RFR) tool 25 operable to receive risk factor definitions. For example, the RFR tool 25 receives and/or defines risk factors from an orthogonal set of perspectives (e.g. business, technology and/or management), as explained below. In embodiments, risk factor attributes may include, for example, a name, a category, a description and/or scale definitions, amongst other risk factor attributes.

Additionally, the computer device 14 includes a context receiving (CR) tool 30 operable to receive and/or define contexts where the risk factors each can be applied and data can be collected. Furthermore, the CR tool 30 is operable to receive a context relationship (e.g., aggregation, implementation, etc.), as explained below. A context is an artifact for which one or more risk factors are applicable and can be evaluated against. For example, a business criticality risk factor can be applied in the contexts of use case and process, as explained below.

The computer device 14 also includes a mapping tool 35 operable to define the mapping from risk factors of contexts to risk consequences related to defects. In embodiments, the mapping tool 35 is operable to determine the dimension where the risk factor generates an impact. Risks are usually measured by levels (in addition to quantitative measurement), and from two dimensions: (1) "failure possibility," which indicates how likely it is that defects will occur within a specific context; and (2) "failure damage," which indicates the consequence of the occurrence of the defect in production (e.g., at the end of the software development life cycle, when, for example, costs to remedy defects are highest), which can usually be stated as an impact to cost, quality, schedule, etc. For example, as explained below, a "business criticality" risk metric will have influence on a failure 'damage' dimension, wherein the higher the "business criticality," the larger the damage. In contrast, for example, a "requirement stability" risk metric has influence on a failure "possibility" dimension, wherein the less stable a requirement is, the higher probability (or possibility) that the software contains more defects and will fail.

The computer device 14 also includes a software breakdown (SB) tool 40 operable to break-down the software into risk evaluation units under consideration. The term software encompasses both software code and documents. In accordance with aspects of the invention, the SB tool 40 is operable to break-down the software into risk evaluation units, for example, based on the context definition received and/or determined by the context receiving tool 30, as explained below.

Additionally, the computer device 14 includes a risk annotation tool 45 operable to evaluate and annotate the software solution with the selected risk factors for the risk evaluation units. In embodiments, the risk annotation tool 45 is operable to assess each risk factor that is associated with each risk evaluation unit, and determine a risk factor value, as explained below.

Furthermore, the computer device 14 includes a risk-based testing tool 50 operable to perform risk-based testing using the output of the risk annotation tool 45, which is explained below. Additionally, the risk-based testing tool 50 is operable to collect test process and test results, which may be used as feedback to adjust the risk grading (e.g., risk factor values), as explained below. In embodiments, the test result may include at least two types of information: defect count (i.e., a number of defects) and defect severity (e.g., severity level one, severity level two, etc.). The risk-based testing tool 50 is operable to capture the metrics (e.g., defect count and defect severity) for each entity subject to risk evaluation.

The computer device 14 also includes a risk evaluation update (REU) tool 55 operable to update the risk evaluation based on the results of the risk-based testing, as explained below. Additionally, the computer device 14 includes a risk model update (RMU) tool 60 operable to enable scrutiny, retrospection and/or improvements the risk model (e.g., as determined by the RFR tool 25, the CR tool 30, and/or the mapping tool 35). For example, the RMU tool 60 is operable to, for example, add and/or delete risk factors, context, and/or mapping. In embodiments, as explained below, after a round of testing is completed, and risk evaluation update is performed (e.g., using the REU tool 55), a user may utilize the RMU tool 60 to implement scrutiny of, retrospection of and/or improvements to the risk model based on the past test experience. The RFR tool 25, the CR tool 30, the mapping tool 35, the SB tool 40, the RA tool 45, the RBT tool 50, the REU tool 55 and the RMU tool 60 can be implemented as one or more program code in the program control 44 stored in memory 22A as separate or combined modules.

The computing device 14 also includes a processor 20, memory 22A, an I/O interface 24, and a bus 26. The memory 22A can include local memory employed during actual execution of program code, bulk storage, and cache memories which provide temporary storage of at least some program code in order to reduce the number of times code must be retrieved from bulk storage during execution. In addition, the computing device includes random access memory (RAM), a read-only memory (ROM), and an operating system (O/S).

The computing device 14 is in communication with the external I/O device/resource 28 and the storage system 22B. For example, the I/O device 28 can comprise any device that enables an individual to interact with the computing device 14 or any device that enables the computing device 14 to communicate with one or more other computing devices using any type of communications link. The external I/O device/resource 28 may be for example, a handheld device, PDA, handset, keyboard etc.

In general, the processor 20 executes computer program code (e.g., program control 44), which can be stored in the memory 22A and/or storage system 22B. Moreover, in accordance with aspects of the invention, the program control 44 controls the RFR tool 25, the CR tool 30, the mapping tool 35, the SB tool 40, the RA tool 45, the RBT tool 50, the REU tool 55 and the RMU tool 60. While executing the computer program code, the processor 20 can read and/or write data to/from memory 22A, storage system 22B, and/or I/O interface 24. The program code executes the processes of the invention. The bus 26 provides a communications link between each of the components in the computing device 14.

The computing device 14 can comprise any general purpose computing article of manufacture capable of executing computer program code installed thereon (e.g., a personal computer, server, etc.). However, it is understood that the computing device 14 is only representative of various possible equivalent-computing devices that may perform the processes described herein. To this extent, in embodiments, the functionality provided by the computing device 14 can be implemented by a computing article of manufacture that includes any combination of general and/or specific purpose hardware and/or computer program code. In each embodiment, the program code and hardware can be created using standard programming and engineering techniques, respectively.

Similarly, the computing infrastructure 12 is only illustrative of various types of computer infrastructures for implementing the invention. For example, in embodiments, the server 12 comprises two or more computing devices (e.g., a server cluster) that communicate over any type of communications link, such as a network, a shared memory, or the like, to perform the process described herein. Further, while performing the processes described herein, one or more computing devices on the server 12 can communicate with one or more other computing devices external to the server 12 using any type of communications link. The communications link can comprise any combination of wired and/or wireless links; any combination of one or more types of networks (e.g., the Internet, a wide area network, a local area network, a virtual private network, etc.); and/or utilize any combination of transmission techniques and protocols.

Flow Diagrams

FIGS. 2-4, 8, 14, 20 and 21 shows exemplary flows for performing aspects of the present invention. The steps of FIGS. 2-4, 8, 14, 20 and 21 (and any other figures that show underlying functionality of the system) may be implemented in the environment of FIG. 1, for example. The flow diagrams may equally represent high-level block diagrams or swim-lane diagrams of the invention. The flowcharts and/or block diagrams in FIGS. 2-4, 8, 14, 20 and 21 illustrate the architecture, functionality, and operation of possible implementations of systems, methods and computer program products according to various embodiments of the present invention. In this regard, each block in the flowcharts, block diagrams or swim-lane diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. Each block of each flowchart, and combinations of the flowchart illustration can be implemented by special purpose hardware-based systems that perform the specified functions or acts, or combinations of special purpose hardware and computer instructions and/or software, as described above. Moreover, the steps of the flow diagrams may be implemented and executed from either a server, in a client server relationship, or they may run on a user workstation with operative information conveyed to the user workstation. In an embodiment, the software elements include firmware, resident software, microcode, etc.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

Furthermore, the invention can take the form of a computer program product accessible from a computer-usable or computer-readable medium providing program code for use by or in connection with a computer or any instruction execution system. The software and/or computer program product can be implemented in the environment of FIG. 1. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disc-read/write (CD-R/W) and DVD.

Figure 2:
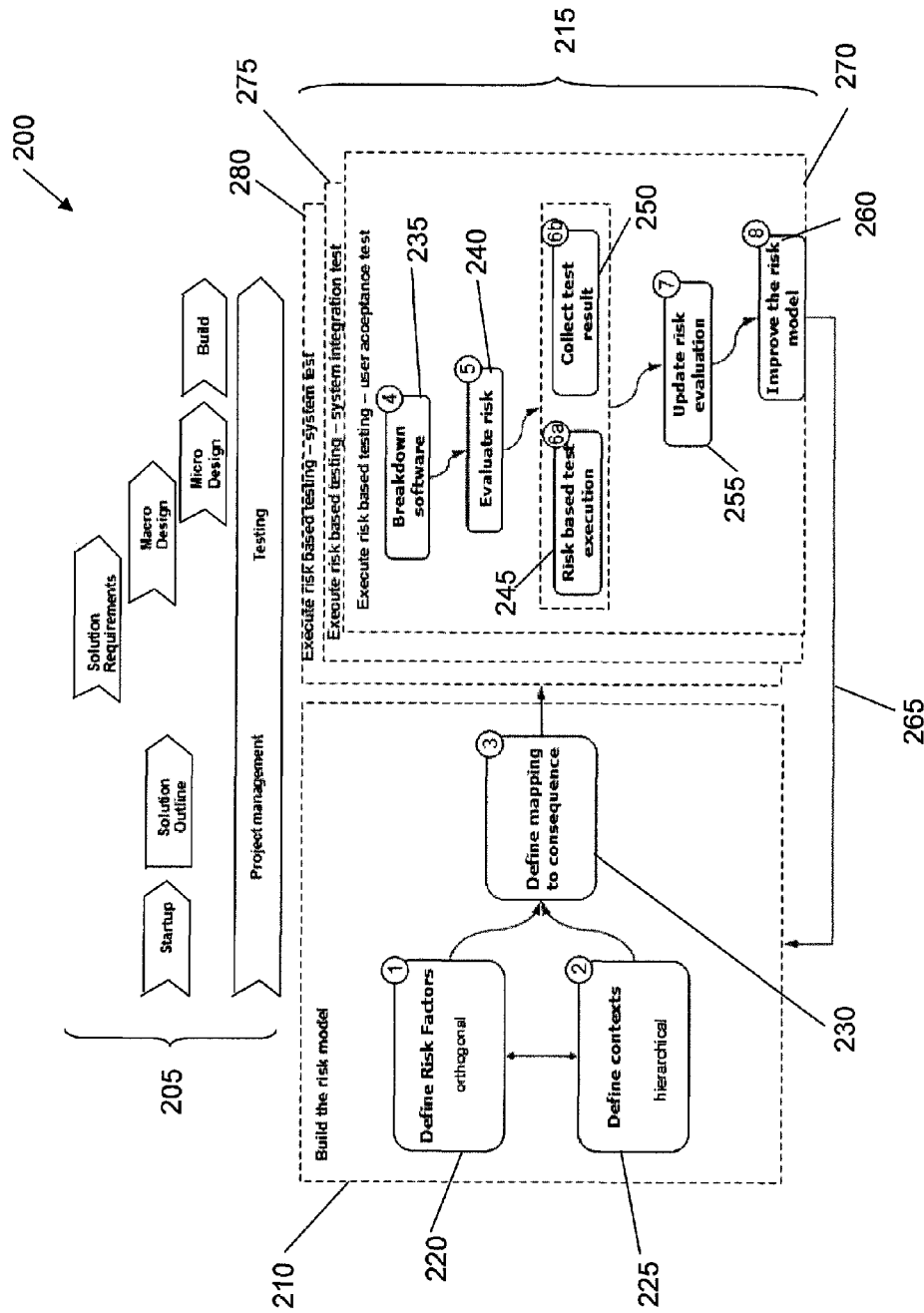

FIG. 2 depicts an exemplary flow diagram 200 in accordance with aspects of the invention. As shown in FIG. 2, the upper part 205 of flow diagram 200 illustrates a typical software development and testing lifecycle (e.g., startup, solution requirements, etc.). The present invention recognizes that testing should be a full life cycle activity that includes activities performed in parallel with the development process rather than subsequent to completion of the development work. Thus, the present invention is related to and operable with the full software development life cycle and not limited to only test phases of the software development life cycle.

As shown in FIG. 2, the exemplary flow diagram 200 includes two stages, namely, building the risk model at stage 210 and executing the risk-based testing at stage 215. Moreover, as illustrated in FIG. 2, the risk-based testing 215 may be performed for each test activity, (e.g., user accept test (UAT) 270, system integration test (SIT) 275 and/or system test (ST) 280).

As shown in FIG. 2, at step 220, the risk factor receiving (RFR) tool is operable to receive and/or define risk factors. In accordance with aspects of the invention, the risk factors are defined (e.g., orthogonally), so that one type of risk factor is not considered multiple times). Additionally, at step 225, the context receiving (CR) tool is operable to define contexts, as explained below. In embodiments, steps 220 and 225 may be performed concurrently. At step 230, the mapping tool receives and/or determines the mapping from the risk factor/context to the consequence, e.g., how the risk factor for this context affects the defect related risk, as discussed below.

In a second phase, the RBT tool 50 executes the risk based testing 215. This risk based testing 215 phase includes, at step 235, the software break-down tool breaking down the software into risk evaluation units, and, at step 240, utilizing the risk annotation tool to evaluate risk of the entity under test. At step 245, the risk-based testing (BRT) tool performs a risk based test execution, and at step 250, the risk-based testing (BRT) tool collects the test results to update the risk evaluation. At step 255, the risk evaluation update tool is utilized to update the risk evaluation. At step 260, the risk model update tool is utilized to identify improvements to the risk model based on the insight gained from actual testing. As illustrated in FIG. 2, this information (e.g., improvements) may be fed back (along path 265) to the building of the risk model stage 210. Additionally, as shown in FIG. 2, the risk-based testing stage 215 may be executed for a plurality of testing stages (e.g., user accept test (UAT) 270, system integration test (SIT) 275 and system test (ST) 280.

Building Risk Model

Defining Risk Factors

FIG. 3 shows an exemplary flow diagram 300 for defining an orthogonal list of risk factors in accordance with aspects of the present invention. An orthogonal list of risk factors requires that every two factors are independent of each other; the valuation of one will not have any influence to the valuation of the other during the evaluation of risk factors in a specific context. As discussed above, the risk factor receiving (RFR) tool 25 is operable to receive risk factor definitions, which may be determined according to exemplary flow diagram 300. In embodiments, the steps of flow diagram 300 may be performed manually, or (at least partially) automatically via an expert system.

As shown in FIG. 3, at step 305, a user (e.g., a service provider or organization) collects as many risk factors as possible that can influence the injection of defects during the software development process. In embodiments, a literature survey may be involved in determining risk factors that can influence the injection of defects during the software development process. At step 310, a user (e.g., a service provider or user knowledgeable in identifying and managing risk) defines how to measure each factor or determine a factor value. The details of step 310 are further described below with reference to FIG. 4.

At step 315, a user analyzes and, if necessary, re-factors the list of factors. For example, once an understanding of each risk factor has been developed, a relationship analysis may be performed on the risk factors to identify ambiguities, overlaps, etc., as described below. Additionally, a user may re-factor the list to make it as orthogonal as possible (where for every situation, there is one and only one correct choice from the options available) based on the analysis.

At step 320, a user or process determines the relationship between the factors. In embodiments, there may be three different relationships between two factors: (1) subset, (2) equivalent, and (3) overlap. A subset indicates that one factor, e.g., factor A, belongs to another factor, e.g., factor B, in terms of what they measure. In that case, at step 330, factor A is deleted. An equivalent indicates that two factors, e.g., factor A and factor B are actually one factor, for which people are using different terms. In this case, at step 325, factors A and B would be merged into one single term that can be better communicated. Overlap, which may be the most common situation, indicates that there are things that factor A and factor B measure in common, but factors A and B also have unique things that the other does not measure. In this case, a user may shrink the scope of one factor (e.g., factor A) by cutting the common part, shrink the scope of both factors (e.g., factor A and factor B) and, at step 340, add a new factor (e.g., factor C) that represents the common part, or, at step 325, merge the two factors (e.g., factor A and factor B) into one higher level factor (e.g., factor D). While the steps of exemplary flow diagram 300 are described above as being performed manually, the invention contemplates that, in embodiments, the risk factor receiving (RFR) tool 25 is operable to perform some of steps 305-340. For example, in embodiments, the RFR tool 25 may perform the determination of the relationship and/or the subsequent merging 325, deleting 330, splitting 335 and/or adding 340.

Figure 6:
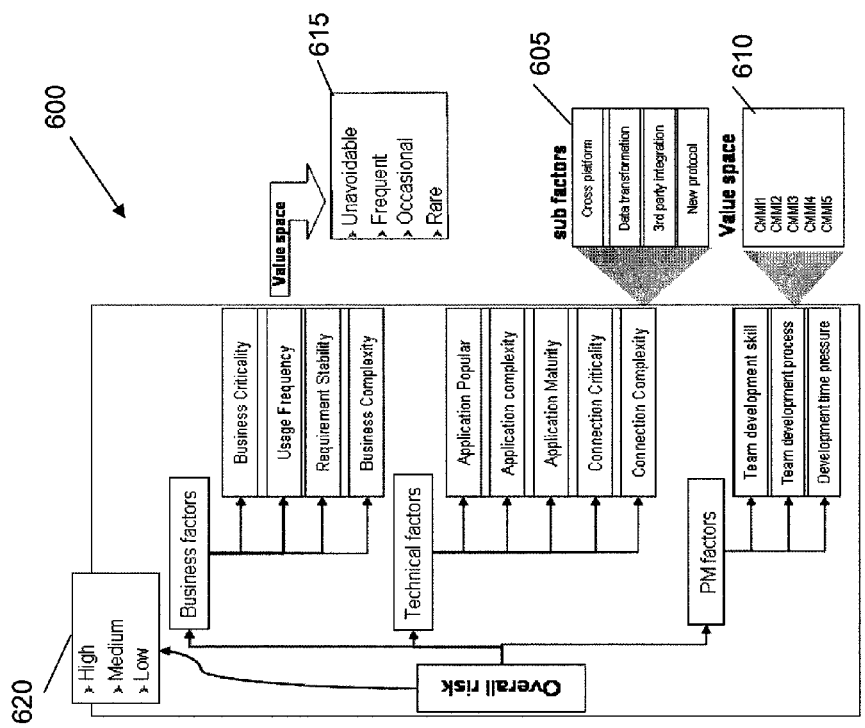
FIG. 6 illustrates an exemplary list of risk factors representing an orthogonal list of risk factors in accordance with aspects of the invention.

FIG. 4 shows an exemplary flow diagram 400 for determining a risk factor value 405, or how to measure each factor (i.e., step 310 described above). As shown in FIG. 4, for example, at step 410, a factor may be subdivided into a set of smaller factors (sub-factors), wherein the risk factor value may be calculated from the sub-factor values. For example, as shown in FIG. 6 (described below), the connection complexity factor can be broken down into four orthogonal sub-factors: cross platform, data transformation, $3^{rd}$ party integration and new protocol. Furthermore, as shown in FIG. 4, at step 415, a questionnaire may be used to determine the factor value. In embodiments, a questionnaire approach may be applicable for factors that are generally evaluated by experts based on their knowledge, skill, or opinion. For example, the "business criticality" factor can be difficult to identify a quantitative value. Thus, for example, the business stakeholders' opinion may be relied upon in order to evaluate business criticality. Additionally, in embodiments, at step 420, factor value determination may be accomplished, for example, by directly measuring (e.g., Capability Maturity Model Integration (CMMI) level, which can be provided directly). For example, a CMMI level 1, may indicate increased risk, whereas a CMMI of level 5 may indicate decreased risk.

Figure 5:
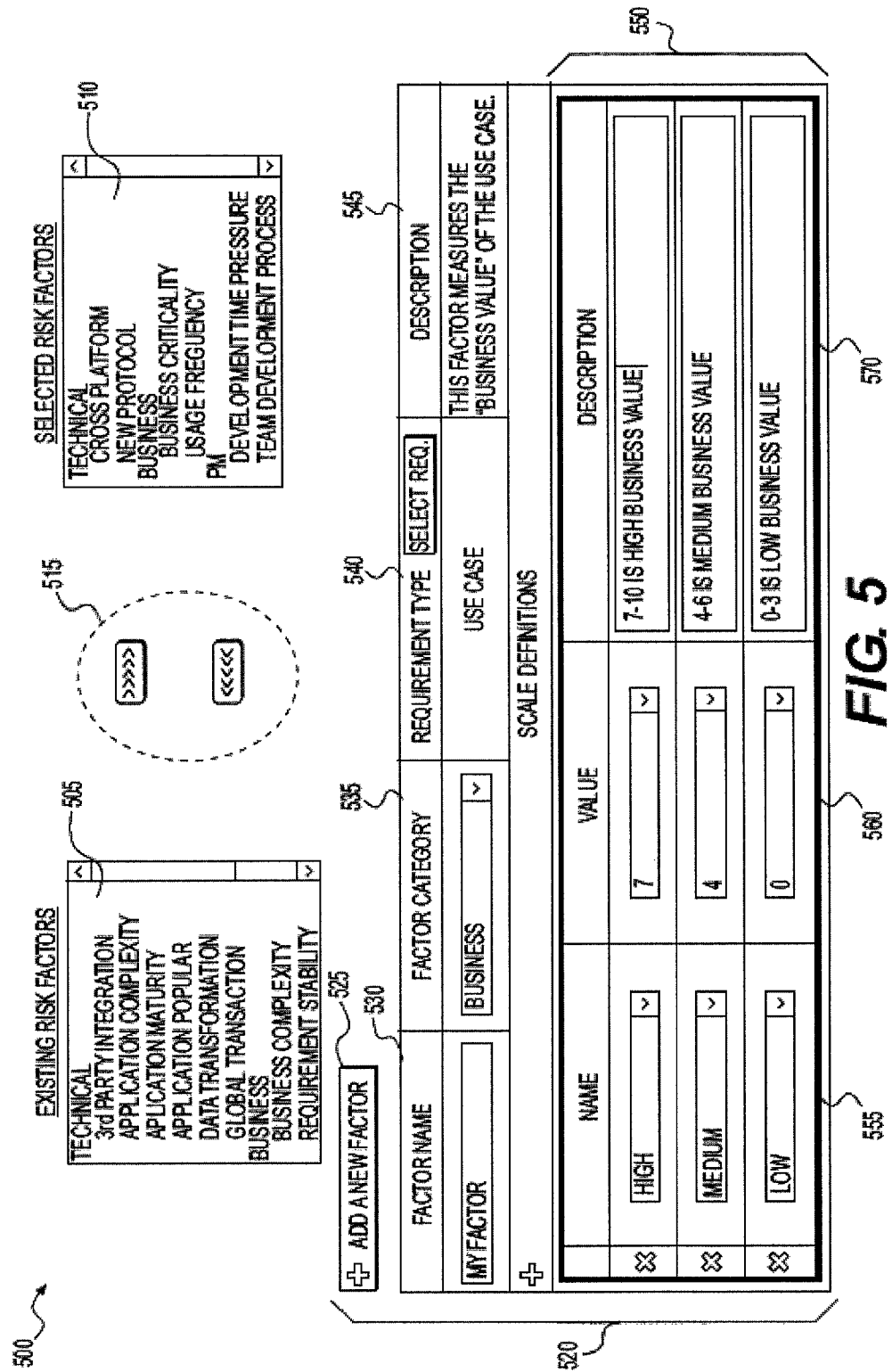
FIG. 5 illustrates an exemplary graphical user interface (GUI) and underlying functionality for determining or defining risk factors in accordance with aspects of the invention.

FIG. 5 illustrates an exemplary graphical user interface (GUI) 500 and underlying functionality for determining or defining risk factors in accordance with aspects of the invention. For example, as described above, the risk factor receiving (RFR) tool 25 receives and/or defines risk factors from an orthogonal set of perspectives (e.g. business, technology and/or project management), as explained below. In embodiments, risk factor attributes may include, for example, a name, a category, a description and/or scale definitions, amongst other risk factor attributes.

In embodiments, the GUI 500 may be provided by the risk factor receiving (RFR) tool 25. In accordance with aspects of the invention, a user (e.g., an organization and/or a service provider) may utilize the exemplary GUI 500 to determine an organization's risk factors for their software development project. The GUI 500 illustrates attributes of a risk factor, for example, name, category, description, and scale definitions.

For example, As shown in FIG. 5, GUI 500 includes a list of existing risk factors 505, which may be a predefined list of risk factors. The list of existing risk factors 505 includes risk factors (e.g., $3^{rd}$ party integration, application complexity, business complexity, etc.) within risk categories (e.g., technical, business and/or project management). Additionally, GUI 500 includes a list of selected risk factors 510, which indicates those risk factors selected (e.g., by a user, an organization or a service provider). Select/de-select buttons 515 are used to select a risk factor to be added from the list of existing risk factors 505 to the list of selected risk factors 510, and/or de-select a risk factor to be removed from the list of selected risk factors 510.

Additionally, as shown in FIG. 5, the exemplary GUI 500 includes an interface 520 to add a new factor (e.g., one not contained in the list of existing factors 505). In embodiments, the interface 520 includes an "add new factor" button 525 and input fields for factor name 530, factor category 535 (e.g., technical, business or project management (PM), amongst other possible categories). Further, the interface 520 includes a requirement type 540 field, which allows a risk factor to be applied for a particular requirement (e.g., use case). The interface 520 also includes a description 545 field, which may be used to describe the risk factor. The exemplary GUI 500 also includes scale definition input fields 550, which are used to define how a particular factor is measured. As shown in FIG. 5, the scale definition input fields 550 include scale definition names 555 (e.g., high, medium and low). The invention contemplates that other scale definition names may be utilized with the invention, for example, unavoidable, frequent, occasional, rare (as illustrated in FIG. 5 discussed below). For each of the scale definition names 555, a corresponding value field 560 indicates (and/or receives) a selected value, and a corresponding scale definition description 570 indicates (and/or receives) a selected description of the scale definitions.

FIG. 6 illustrates an exemplary list of risk factors 600 representing an orthogonal list of risk factors. As shown in FIG. 6, the risk factors are organized by risk categories (e.g., business factors, technical factors and project management (PM) factors). Furthermore, as shown in FIG. 6, some risk factors (e.g., connection complexity) may be further classified into orthogonal sub factor categories 605 (e.g., cross platform, data transformation, $3^{rd}$ party integration and new protocol). Also, as shown in FIG. 6, a risk factor (e.g., team development process) may be assigned a value (e.g., from the value space 610) based on maturity values (e.g., CMMI values). Furthermore, a risk factor (e.g., usage frequency) may be assigned a value space using scale definition names 615 of, for example, unavoidable, frequent, occasional and/or rare.

The exemplary list of risk factors 600 also includes an overall risk level selection window 620, which, for example, indicates which risk factors (as they relate to scale definitions, e.g., high, medium or low) are listed in the exemplary list of risk factors 600. That is, as shown in FIG. 6, the exemplary list of risk factors 600 lists "high," "medium" and "low" risk factors. However, for example, using the overall risk level selection window 620, a user could select for display in the list of risk factors 600 only those risk factors that are of medium scale. That is, each of the risk categories (e.g., business factors, technical factors, and PM factors) may have high risks, medium risks and low risks. Thus, by utilizing the overall risk level selection window 620, a user can tailor (e.g., re-factor or re-engineer) the list of risk factors 600.

Building Risk Model

Defining Contexts

FIG. 7 shows an exemplary and non-exhaustive list 700 of contexts in the software testing domain. A context is an artifact for which one or more risk factors are applicable and can be evaluated against. For example, the business criticality risk factor can be applied in the contexts of "use case" and "process." A use case or process is said to be "unavoidable" if it is an area of the product that most users will come in contact with during an average usage session (e.g., start-ups, printing and saving). In other words, as explained further below, contexts indicate where each of the risk factors can be applied and data can be collected for determining risks. As discussed above, a context receiving (CR) tool is 30 operable to receive and/or define contexts where the risk factors each can be applied and data can be collected. Furthermore, the CR tool 30 is operable to receive a context relationship (e.g., aggregation, implementation, etc.).

FIG. 8 shows an exemplary flow diagram 800 for defining contexts and context relationships in accordance with aspects of the present invention. As shown in FIG. 8, at step 805, a user (e.g., a service provider or organization), for example, using the context receiving (CR) tool, identifies contexts for a software development project. In embodiments, the CR tool may enable a top-down approach to define contexts. At step 810, a user identifies context relationships.

FIG. 9 illustrates an exemplary hierarchical structure 900 of an IT system, which may facilitate a top-down approach to define contexts. For example, as shown in FIG. 9, the exemplary hierarchical structure 900 illustrates that method 905 is a subset of class 910 and that data 915 is a subset of connection 920. Also, the exemplary hierarchical structure 900 illustrates that method 905 and class nest within subsystem 925. In embodiments, the CR tool may utilize such a hierarchical structure 900 for enabling a user to determine the contexts (e.g., connections, for associating risk factors.

Referring to step 810 of FIG. 8, the exemplary hierarchical structure 900 of FIG. 9 illustrates an aggregate context relationship. With the aggregate relationship (e.g., subsets) defined, the CR tool may determine the overall risk of one context (e.g., component) from the risk of contained contexts (e.g., class and component) by, for example, average or sum. Additionally, between different categories, there can be an implementation relationship, wherein, for example, the risk of an implementing context can be influenced to some extent by the implemented context. For example, requirement contexts are implemented by IT system contexts. With the implementation relationship defined, the CR tool enables an accounting for such implementation relationship.

As noted above, in accordance with aspects of the invention, the defining of the risk factors and the defining the contexts may be performed in parallel (e.g., using the RFR tool 25 and the CR tool 30 or manually). By examining each context, a user can identify the risk factors that apply to that context. By determining a complete list of contexts, the present invention ensures that factors (e.g., important risk factors) are accounted for and not overlooked.

FIG. 10 illustrates an exemplary association table 1000 between the example risk factors and the example risk context in accordance with aspects of the invention. In embodiments, the RFR tool 25 and the CR tool 30 may generate the exemplary association table 1000. As shown in FIG. 10, the exemplary association table 1000 includes a risk factor column 1005, a sub factors column 1010, a risk context column 1015 and a risk dimension column 1020. The risk factor column 1005 lists those risk factors 1030 for an exemplary project, which are grouped by risk factor categories 1025. As shown in FIG. 10, the exemplary association table 1000 illustrates the association between the exemplary risk factors and the exemplary risk contexts. For example, the "connections" risk context is associated with all of the project management (PM) risk factors (e.g., team development skill, team development process and development time pressure. As discussed further below, implementing the present invention to define risk contexts and associate risk factors with contexts enables a determination of overall risk.

Building Risk Model

Mapping from Risk Metrics of Contexts to Risk Consequences for Defects

In accordance with further aspects of the invention, the mapping from risk factors of contexts to risk consequences related to defects is defined. As discussed above, in embodiments, a mapping tool 35 is operable to define the mapping from risk factors of contexts to risk consequences related to defects. In embodiments, the mapping tool 35 is operable to determine the dimension where the risk factor generates an impact. Risks may be measured by levels (in addition to quantitative measurement), and from two dimensions: (1) "failure possibility," which indicates how likely it is that defects will occur within a specific context; and (2) "failure damage" which indicates the consequence of the occurrence of the defect in production (which can usually be stated as an impact to cost, quality, schedule, etc.).

In embodiments, the mapping tool 35 is operable to determine (or receive) a dimension where a risk factor generates impact. For example, as illustrated in FIG. 10, the "business criticality" risk factor will have influence on the failure damage dimension (e.g., the higher the business criticality, the larger the damage). In contrast, as illustrated in FIG. 10, the "requirement stability" risk factor has influence on the failure possibility dimension (e.g., the less stable a requirement is, the higher probability that the requirement contains more defects and will fail). In embodiments, the overall risk of a context can be determined based on the level of failure possibility and failure damage, or directly based on individual risk factors. Additionally, the mapping tool 35 may determine overall risk using, for example, if-then rules and/or numeric calculations, amongst other methodologies.

Figure 11:
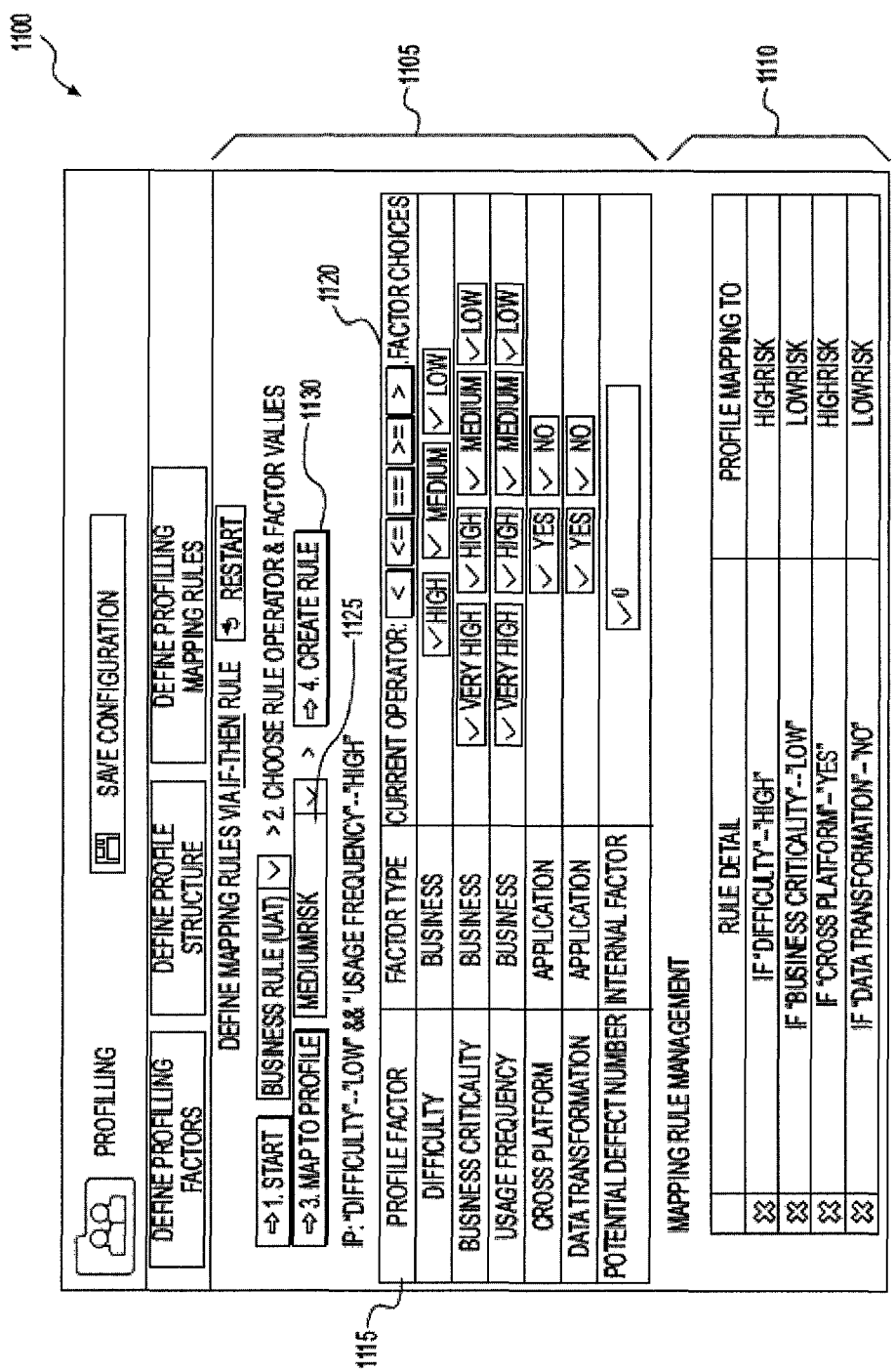
FIG. 11 illustrates an exemplary GUI and underlying functionality in accordance with aspects of the present invention.

FIG. 11 illustrates an exemplary GUI 1100 and underlying functionality for inputting if-then rules (e.g., an if-then rules wizard). In embodiments, the mapping tool 35 may provide the exemplary GUI 1100. Furthermore, in embodiments, the mapping tool 35 may receive the inputted if-then rules. As shown in FIG. 11, the exemplary GUI 1100 enables a user to define mapping rules via if-then rules 1105 to create a mapping rule management 1110. For example, a user, via the GUI 1100, may select a profile factor from the profile factor list 1115 (e.g., difficulty, usage frequency, etc.) and choose a rule operator and factor values 1120 (or choices), for example, less than, equal to, etc. and high, medium or low, respectively. Additionally, the user may map to a profile 1125 (e.g., low risk, medium risk or high risk). The rule may then be created via the "create rule" button 1130, which results in the rule being displayed in the mapping rule management 1110.

As shown in FIG. 11, four exemplary rules are listed in the mapping rule management 1110. For example, according to the rules determined for the exemplary GUI 1100, if business criticality is (or equal to) low, then overall risk is low. With this example, three levels are defined for the overall risk, e.g., high risk, medium risk, and low risk. The invention contemplates other rules, and the invention should not be limited by the above exemplary rules.

In accordance with further aspects of the invention, the mapping tool 35 is operable to quantify risk as a numerical value. FIG. 12 illustrates an exemplary calculation logic table 1200. In embodiments, the mapping tool 35 may use the exemplary calculation logic table 1200 to determine an overall risk for a software development project. As shown in FIG. 12, the exemplary calculation logic table 1200 includes a failure damage factor column 1205 (which includes risk factor (or sub factor) columns of business criticality 1210 and visibility 1215) and a failure possibility factors column 1220 (which includes risk factors (or sub factors) columns of complexity 1225 and change frequency 1230. Additionally, the exemplary calculation logic table 1200 includes a risk column 1245, which indicates a quantification of risk. The exemplary calculation logic table 1200 also includes a weight row 1235, which indicates a relative weight of the different relevant risk factors (e.g., as determined using the RFR tool). As shown with this example, the visibility risk factor has a relative weight (ten) approximately three times the relative weights (three) of the other listed risk factors. The values for the weight row 1235 may be determined using empirical data. Furthermore, relevant contexts 1240 (e.g., as determined using the CR tool) are listed area to test column 1202.

The mapping tool 35 may determine the overall risk by multiplying the failure damage risk by the failure possibility risk. Each of the failure damage risk by the failure possibility risk is a weighted sum of the values of the relevant risk factors. For example, using the exemplary calculation logic table 1200, for the order registration function (e.g., a certain context), risk=(3*2+10*4)*(3*5+3*1)=46*18=828. As a further example, for the invoicing function (e.g., another context), risk=(3*4+10*5)*(3*4+3*2)=62*18=1,116. In embodiments, the mapping tool 35 may further map these numeric results to risk levels (e.g., high, medium and low).

Executing Risk Model

In accordance with further aspects of the invention, after building the risk model, as described above, the present invention is operable to execute the risk model, as described below. As noted above, the execution of the risk model may be repeated for each stage in the software life cycle (e.g., unit test (UT), system test (ST), system integration test (SIT) and user acceptance test (UAT), amongst other stages). In embodiments, testing is performed through each stage of the software lifecycle.

FIG. 13 shows an exemplary table 1300 illustrating the test activities 1305 that can be performed, and the related test design reference 1310 and artifacts that are the targets under test 1315. In accordance with aspects of the invention, the test design reference 1310 may be used by a test designer to identify test requirements, test cases and the expected correct behavior and/or condition of the artifacts under test 1315. The artifact under test 1315 is the entity that is under test to identify possible defects. In accordance with aspects of the invention, both the test design reference 1310 and the artifacts under test 1315 may be contexts that will undergo risk evaluation. For example, for a context of test design reference A, the corresponding artifact under test B is a context that implements A. In embodiments, both the test design reference A and the corresponding artifact under test B may be evaluated and the evaluation results may be combined to produce the overall risk.

For example, as shown in FIG. 13, at system integration test, system requirements are the common test design references. Each requirement item can be an individual reference (context). Additionally, the code that implements the requirement item is the corresponding context. For risk based system testing, the risk of the requirement item and the risk of the implementing code all contribute to the overall risk, and determine how much effort should be invested to manage the risk. By implementing the present invention, the risk of the requirement item and the risk of the implementing code for implementing the requirement are accounted for in determining an overall risk.

Figure 14:
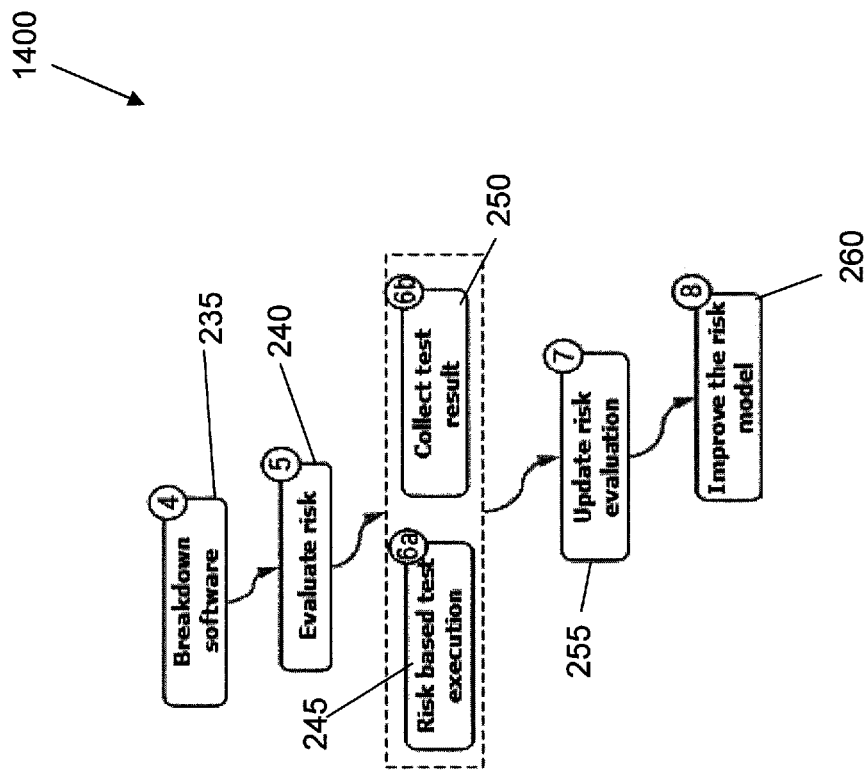
FIG. 14 illustrates an exemplary flow diagram for performing aspects of the present invention.

FIG. 14 illustrates an exemplary flow diagram 1400 for executing the risk model. As can be observed, FIG. 14 is similar to a portion of the flow diagram shown in FIG. 2. As shown in FIG. 14, at step 235, the software break-down tool breaks down the software into risk evaluation units, and, at step 240, the risk annotation tool is utilized to evaluate risk of the entity under test. At step 245, the risk-based testing (BRT) tool performs (or enables) a risk-based test execution, and at step 250, the risk-based testing (BRT) tool collects the test results to update the risk evaluation. At step 255, the risk evaluation update tool is utilized to update the risk evaluation. At step 260, the risk model update tool is utilized to identify improvements to the risk model based on the insight gained from actual testing. In embodiments, these steps may be performed manually. Each of these steps is described in more detail below.

Executing Risk Model

Break Down Software into Risk Evaluation Units

In accordance with further aspects of the invention, the software is broken down into risk evaluation units under consideration. In embodiments, the software break-down (SB) tool 40 is operable to break down (or facilitate break-down of) the software into risk evaluation units under consideration. The term "software" encompasses both software code and documents. Documents (or artifacts) are materials that a consumer uses to understand the software code. In accordance with aspects of the invention, the SB tool 40 is operable to break down the software into risk evaluation units, for example, based on the context definition received and/or determined by the context receiving tool 30, as explained below.

For example, referring again to FIG. 13, as shown in the exemplary table 1300 in system test, the test design reference indicates application requirements. If these application requirements are defined in terms of use cases, the application requirements can be broken down into use cases.

Figures 15, 16:
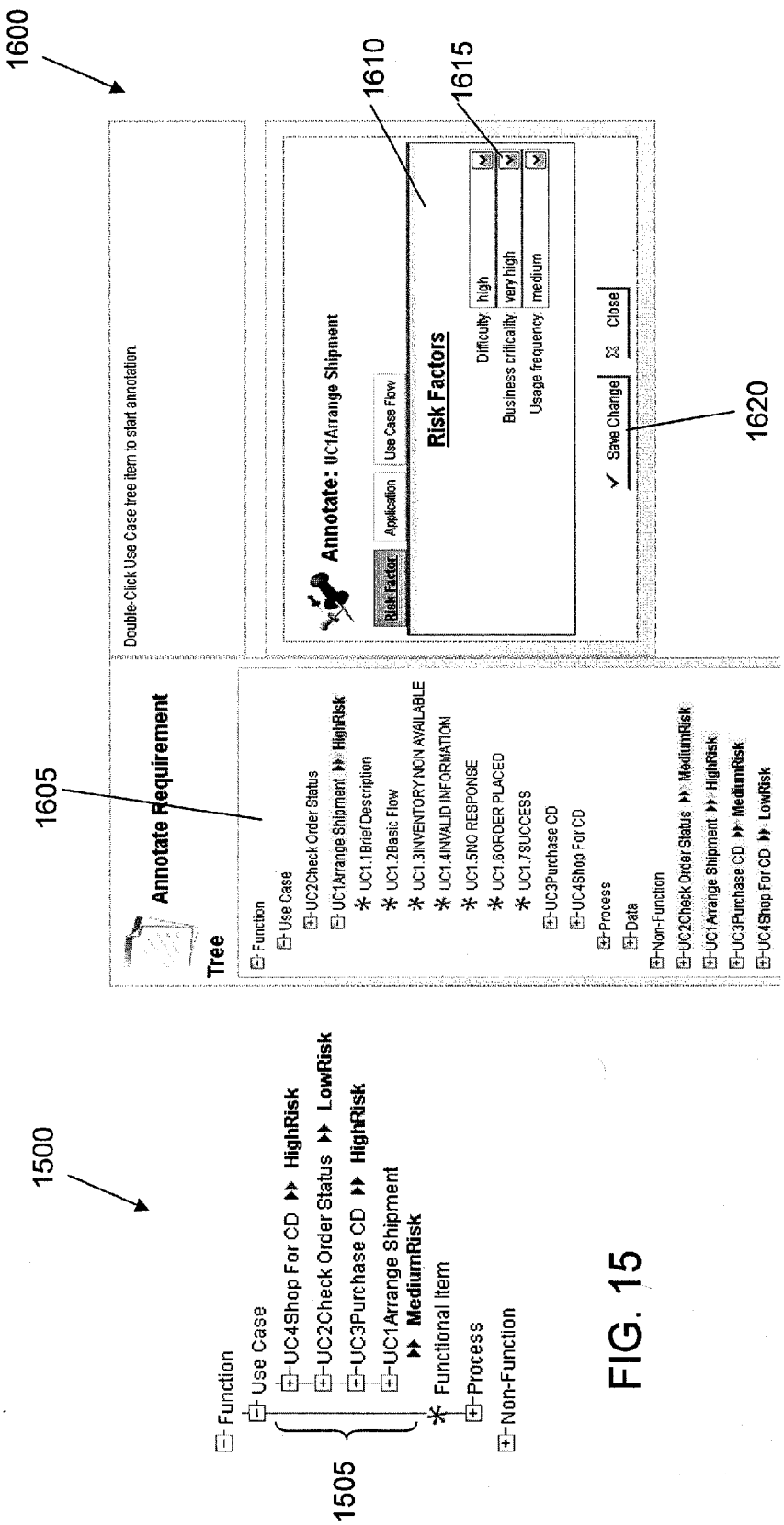
FIG. 15 shows an exemplary GUI and underlying functionality illustrating of a tree structured break-down of use cases in accordance with aspects of the invention.
FIGS. 16-18 show exemplary GUIs and underlying functionality in accordance with aspects of the present invention.

FIG. 15 shows an exemplary GUI and underlying functionality illustrating a tree structured break-down 1500 of use cases 1505 for an exemplary compact disc (CD) shopping application. As shown in FIG. 15, four use cases 1505 are defined for requirements (e.g., shop for a CD, purchase CD, check order status and shop for CD). In accordance with aspects of the invention, these use cases may constitute risk evaluation units. Additionally, each use case 1505 can be broken down recursively into risk evaluation units. For example, a use case 1505 can be described by a series of use case steps, as described below. Additionally, in accordance with aspects of the invention, the use case steps can also be treated as a context that can be evaluated for risk.

Executing Risk Model

Risk Evaluation and Annotation

In accordance with further aspects of the invention, the software solution is evaluated with the selected risk factors for these risk evaluation units. In embodiments, the risk annotation tool 45 is operable to evaluate and annotate (or enable a user to evaluate and annotate) the software solution with the selected risk factors for the risk evaluation units. In embodiments, the risk annotation tool 45 is operable to assess each risk factor that is associated with each risk evaluation unit, and determine a risk factor value, as explained below.

FIG. 16 shows an exemplary screenshot of a GUI 1600 illustrating a possible implementation of risk annotation in accordance with aspects of the invention. The risk annotation may be used to prioritize requirements, create linkages to system architecture and/or group requirements into different test profiles. Additionally, in accordance with aspects of the invention, risk annotation may enable optimization of test cases and test plan generation for additional testing (e.g., UAT and SIT). In embodiments, the GUI 1600 may be provided by the risk annotation tool 45.

As shown in FIG. 16, when a user (e.g., a development team, an organization or service provider) selects a use case (e.g., arrange shipment) from the tree 1605, the risk annotation tool displays a list of risk factors 1610 that apply to this context (e.g., arrange shipment). For example, in this case, the risk factors are: difficulty, business criticality, and usage frequency. Additionally, the GUI 1600 provides a drop-down list menu 1615 for each risk factor, enabling a user to select a risk value from the drop-down list menu 1615 for each of the risk factors. The drop-down list 1615 is already populated with the pre-defined values (e.g., high, very high, medium and low, amongst other pre-defined values). The GUI 1600 also includes a save changes button 1620 operable to save changes made to the risk annotations.

In accordance with aspects of the invention, as described below, the present invention is operable to automatically calculate the risk score of the selected use case (e.g., arrange shipment), using the inputs of the risk mapping rule, which have been determined during the risk model building. Otherwise, the user can continue to perform risk annotation.

Alternatively, in embodiments, the risk annotation tool 45 may apply, e.g., high, medium and low methodologies, for determining risk annotations, as in this example, difficulty, business criticality, and usage frequency.

Executing Risk Model

Risk-Based Testing

In accordance with further aspects of the invention, the evaluated (e.g., annotated) software solution is used to perform risk-based testing. In embodiments, a risk-based testing tool 50 is operable to perform risk-based testing using the output of the risk annotation tool 45. Additionally, the risk-based testing tool 50 is operable to collect test process and test results, which may be used as feedback to adjust the risk grading (e.g., risk factor values), as explained below.

With the present invention, risk-based testing policy is definable from different dimensions (e.g., test coverage level, tester skill, test effort, etc.). Additionally, users (e.g., a software development team, an organization or service provider) can add dimensions (e.g., custom dimensions) to define the risk-based testing as needed. Thus, implementing the present invention provides a more flexible approach for users to select what they think is appropriate for defining the risk-based testing under different constraints (e.g., time, resource, skill level, etc). Additionally, the present invention provides a system and method for differentiating test policies (e.g., risk-based testing definitions under different constraints). Additionally, in embodiments, the risk-based testing tool 50 is operable to select what an appropriate risk-based testing definition under different constraints.

Figure 17:
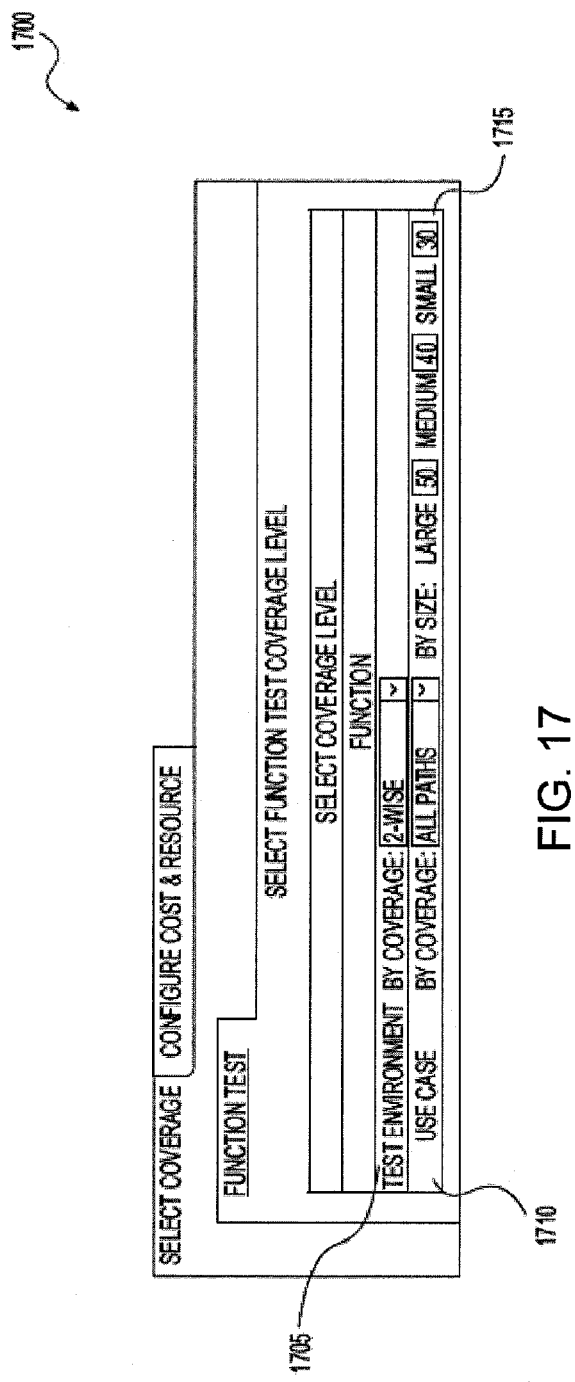

FIG. 17 shows an exemplary GUI 1700 and underlying functionality for configuring a test coverage level for high risk requirements. Code coverage is a measure used in software testing, which describes the degree to which the source code of a program has been tested. As shown in FIG. 17, with high risk requirements, the use case context 1710 should use "all paths" coverage and the test environment context 1705 should use "pair-wise" (or "2-wise") coverage. All paths coverage is a testing method using an exhaustive search of all combinations of all parameters. In contrast, pair-wise testing (or all-pairs testing) is a combinatorial software testing method that, for each pair of input parameters to a system (e.g., a software algorithm), tests all possible discrete combinations of those parameters. Pair-wise testing can be done much faster than an exhaustive search of all combinations of all parameters, by "parallelizing" the tests of parameter pairs. Pair-wise testing of a system or subsystem provides a reasonable cost-benefit compromise between often computationally infeasible higher-order combinatorial testing methods and less exhaustive methods, which fail to exercise all possible pairs of parameters.

For example, suppose a system integration testing involves three operating systems (OS), two web browsers, and four application servers, an exhaustive testing for different software/hardware configurations (e.g., all paths methodology) involves 3*2*4=24 combinations. However, such exhaustive testing is time-consuming and usually unaffordable. Instead of testing every combination, with pair-wise coverage, each setting of each aspect (e.g., OS, browser and application server) is combined at least once with each setting of each other aspect. In effect, this results in all the interactions between any two aspects being tested.

As shown in FIG. 17, the exemplary GUI 1700 also includes an interface 1715 for selecting coverage level by size. The coverage level by size allows a user to directly assign a test case number for a function of certain size. The example illustrates that there should be fifty test cases for large functions, forty test cases for medium functions, and thirty test cases for small functions.

Figure 18:
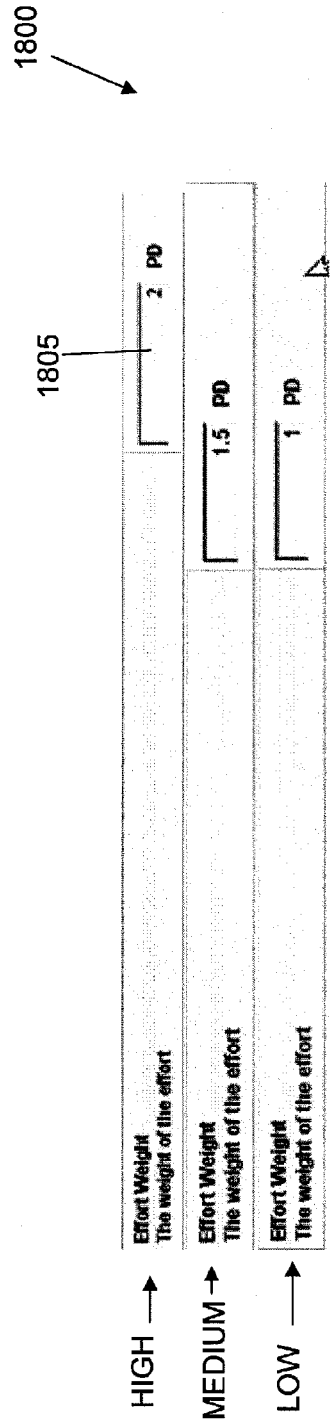

FIG. 18 shows an exemplary GUI 1800 and underlying functionality for configuring effort weight for different risk levels (e.g., high, medium and low). In accordance with aspects of the invention, configuring effort weight for different risk levels focuses effort investment based on the risk level, resulting in a more effective and efficient test. The exemplary GUI 1800 includes input fields 1805 for effort weights for different risk levels. The exemplary effort weight values illustrated in FIG. 18 of 2, 1.5 and 1 indicate the effort for a requirement of "Low" risk level is 1 person days (PD), the effort for a requirement of a "Medium" risk level is 1.5 PDs and the effort for a requirement of a "High" risk level is 2 PDs. Thus, the present invention, for example, via exemplary GUI 1800, by enabling configuration of effort weight for different risk levels (e.g., high, medium and low) ensures that precious test effort is biased toward higher risk level requirements. Thus, by implementing the present invention more defects with higher severity levels and/or impacts to, e.g., an organization will be discovered. In contrast, the risk-based testing technique of the present invention focuses effort investment based on the risk level, resulting in a more effective and efficient test.

Executing Risk Model

Collect Test Process and Test Results

In accordance with further aspects of the invention, test process and test results are collected. The collected test process and test results may be used as feedback, e.g., to adjust the risk grading. In embodiments, the risk-based testing tool 50 is operable to collect test process and test results, which may be used as feedback to adjust the risk grading (e.g., risk factor values), as explained below. The test result may include at least two types of information: defect count (i.e., a number of defects) and defect severity (e.g., severity level one, severity level two, etc.). The risk-based testing tool 50 is operable to capture the metrics (e.g., defect count and defect severity) for each entity subject to risk evaluation. The defect severity indicates the failure impact from technical perspective. For example, the defect may cause an outage or may just be a cosmetic problem. Another metric is defect density, which is calculated by dividing the defect number with the size of the entity (e.g., lines of code). The defect density is an indicator of the failure probability. For example, a higher defect density indicates larger failure probability. In accordance with aspects of the invention, the metrics (e.g., defect count, defect severity and/or defect density) may be used to calibrate the original risk evaluation, as described below.

Executing Risk Model

Update Risk Evaluation

Figure 19:
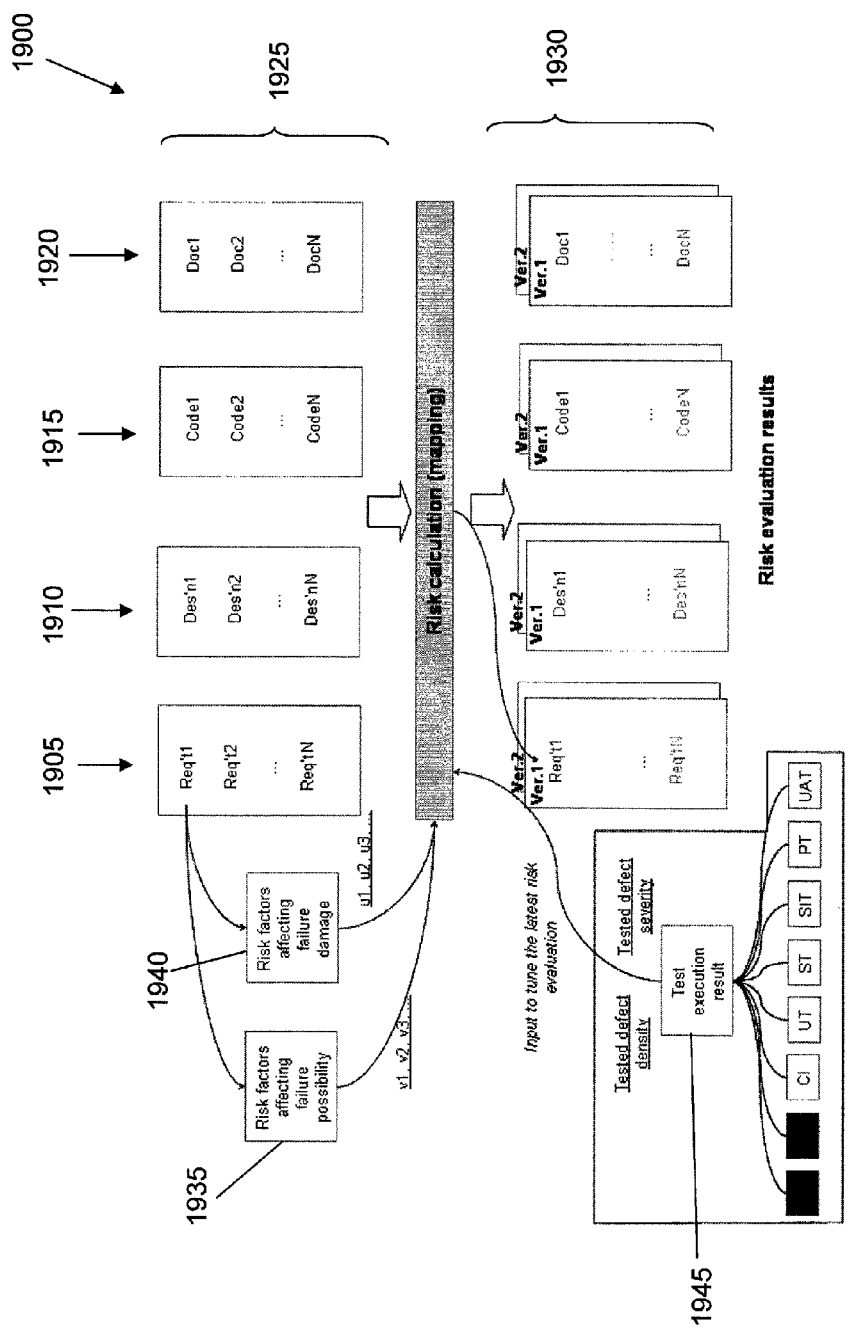
FIG. 19 illustrates an exemplary flow diagram for updating a risk evaluation in accordance with aspects of the present invention.

FIG. 19 illustrates an exemplary flow diagram 1900 for updating a risk evaluation in accordance with aspects of the present invention. In embodiments, the risk evaluation update (REU) tool 55 is operable to update the risk evaluation based on the results of the risk-based testing, as explained below. As shown in FIG. 19, four types of entities are listed: requirement 1905, design 1910, code 1915 and document 1920, although other entities are contemplated. They represent the entities under consideration at testing points in the life cycle (e.g., high level review (HLR), design level review (DLR), code inspection (CI), unit testing (UT), and documentation testing, which is a non-functional requirement testing that can happen within any test activity). It should be understood that the invention contemplates other types of entities. For example, system integration test (SIT) can test connections between applications, another type of entity.

As shown in FIG. 19, the upper portion 1925 illustrates how the entities (e.g., requirement 1905, design 1910, code 1915 and document 1920) are used to determine the initial risk calculation (or mapping), as described above. For example, risks factors affecting failure possibility 1935 and risks factors affecting failure damage 1940 may be used to determine a risk calculation (or mapping).

Additionally, as shown in FIG. 19, such entities (e.g., requirement 1905, design 1910, code 1915 and document 1920) will have at least two versions of risk evaluation results 1930. For example, version 1 is the risk evaluation results from before a particular related test activity begins (e.g., from a previous test activity) and version 2 is the risk evaluation results from the particular related test activity (e.g., after the related test activity ends). Utilizing the present invention, a test team may decide to perform multiple rounds of risk evaluation, in which case, there would be multiple versions (e.g., version 1-version n, where n is the number of rounds of risk evaluation).

In accordance with aspects of the invention, the test execution result 1945 may be used as an input to tune the latest risk evaluation, e.g., in an iterative process. For example, in embodiments, if the last risk level is high, and the test result indicated that the risk level is high as well, then the risk evaluation update tool 55 may decrease the risk level by one (e.g., to medium). The rationale behind this rule is that the prediction of risk level is correct, and since enough test investment has been made, it is most likely that the risk should have been mitigated, so the risk level may be decreased to medium. This will ensure that next testing cycle will put medium level test effort on the associated artifact under test. Additionally, for example, if the last risk level is high, and the test result indicated that the risk level is low, then decrease the risk level by two (e.g., to low). The rationale behind this rule is that the prediction of risk level is incorrect, and since an overly large test investment has been made, it is most likely that the risk level becomes even lower, so the risk level can be decreased by two. This will ensure that the next testing cycle will put the lowest level test effort on the associated artifact under test.

As a further example of updating the risk evaluation, if the last risk level is low, and the test result indicated that the risk level is high, then increase the risk level by two (e.g., to high). The rationale behind this rule is that the prediction of risk level is incorrect, and since too small of a test investment has been made, it is most likely that the risk level has not changed at all, so the risk level can be increased by two. This will ensure that the next testing cycle will put the highest level test effort on the associated artifact under test. If the last risk level is low, and the test result indicated that the risk level is low, then the risk level should remain unchanged. The rationale behind this rule is that the prediction of risk level is correct, and since the correct test investment has been made, it is most likely that the risk level is unchanged. This will ensure that next testing cycle will keep the as-is test effort investment on the associated artifact under test.

TABLE 1 shows a sample example update rule in accordance with aspects of the invention. The sample update rules illustrated in TABLE 1 correspond with the exemplary update rules discussed above.

TABLE 1

| Last risk level | H | | L | |
|---|---|---|---|---|
| Test result indicated risk level | H | L | H | L |
| Update action | Decrease the risk level by 1 | Decrease the risk level by 2 | Increase the risk level by 2 | Keep risk level unchanged |

Figure 20:
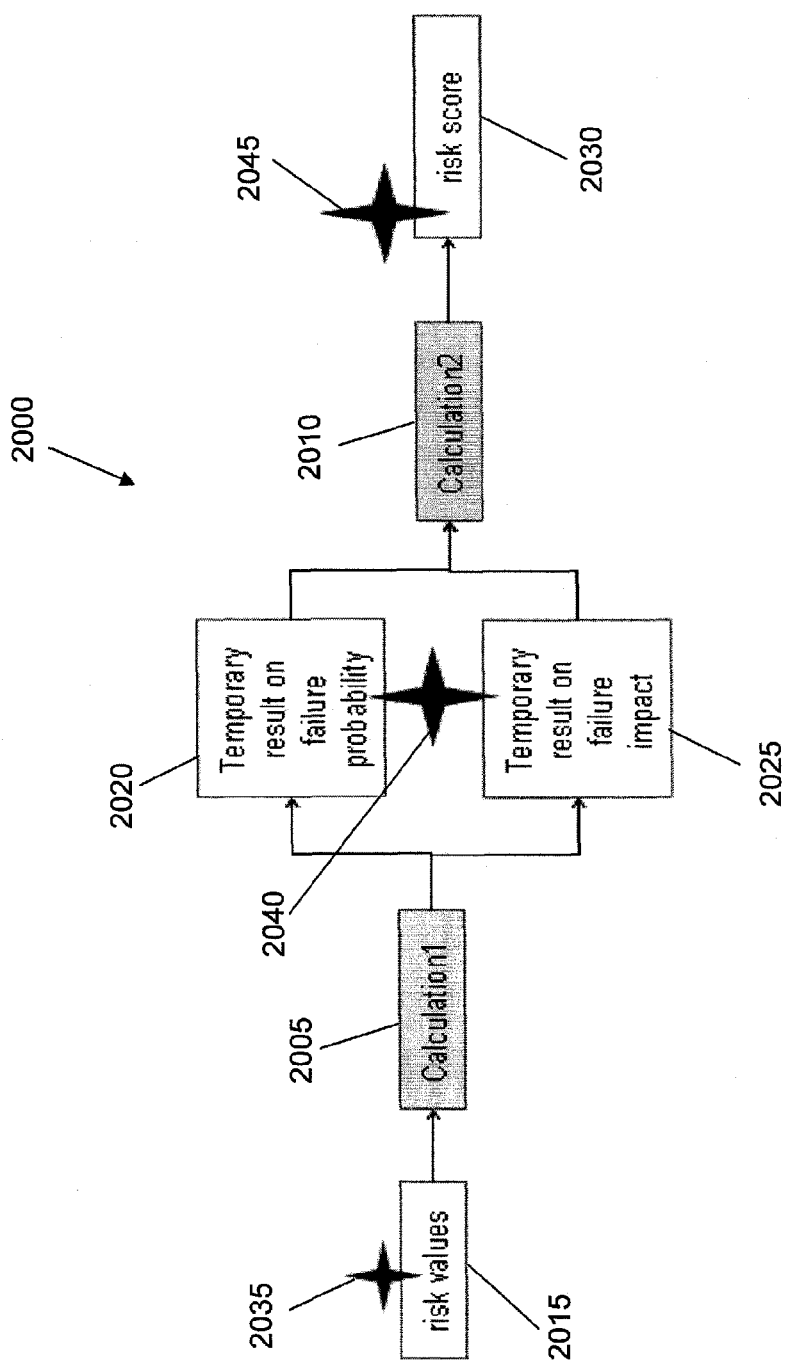
FIG. 20 illustrates tuning opportunities for updating an exemplary risk mapping in accordance with aspects of the present invention.

FIG. 20 illustrates tuning opportunities for updating an exemplary risk mapping. The present invention enables a general approach to perform risk updates. For example, an actual update may be more complex than an update rule (e.g., as shown in TABLE 1 above). For example, as shown in FIG. 20, a risk calculation logic 2000 may utilize two calculation steps 2005 and 2010, wherein calculation 2005 maps risk values 2015 to temporary results on failure probability 2020 and temporary results on failure impact 2025. Additionally, as shown in FIG. 2000, calculation 2010 maps the two temporary results to the final risk score 2030. The stars 2035, 2040 and 2045 indicate opportunities for "tuning" based on actual test execution results.

A risk value tuning 2035, for example, may arise when the original failure impact of the entity under test is overestimated (e.g., the defect severity (aggregated)). Thus, the risk value tuning 2035 may decrease the failure impact value. A temporary result tuning 2040, for example, may arise when the originally calculated failure probability is too high based on a low defect density. Thus, the temporary result tuning 2040 may decrease the failure probability. A risk score tuning 2045, for example, has been illustrated by the sample update rule discussed above, where the risk score tuning 2045 adjusts the risk level.

Figure 21:
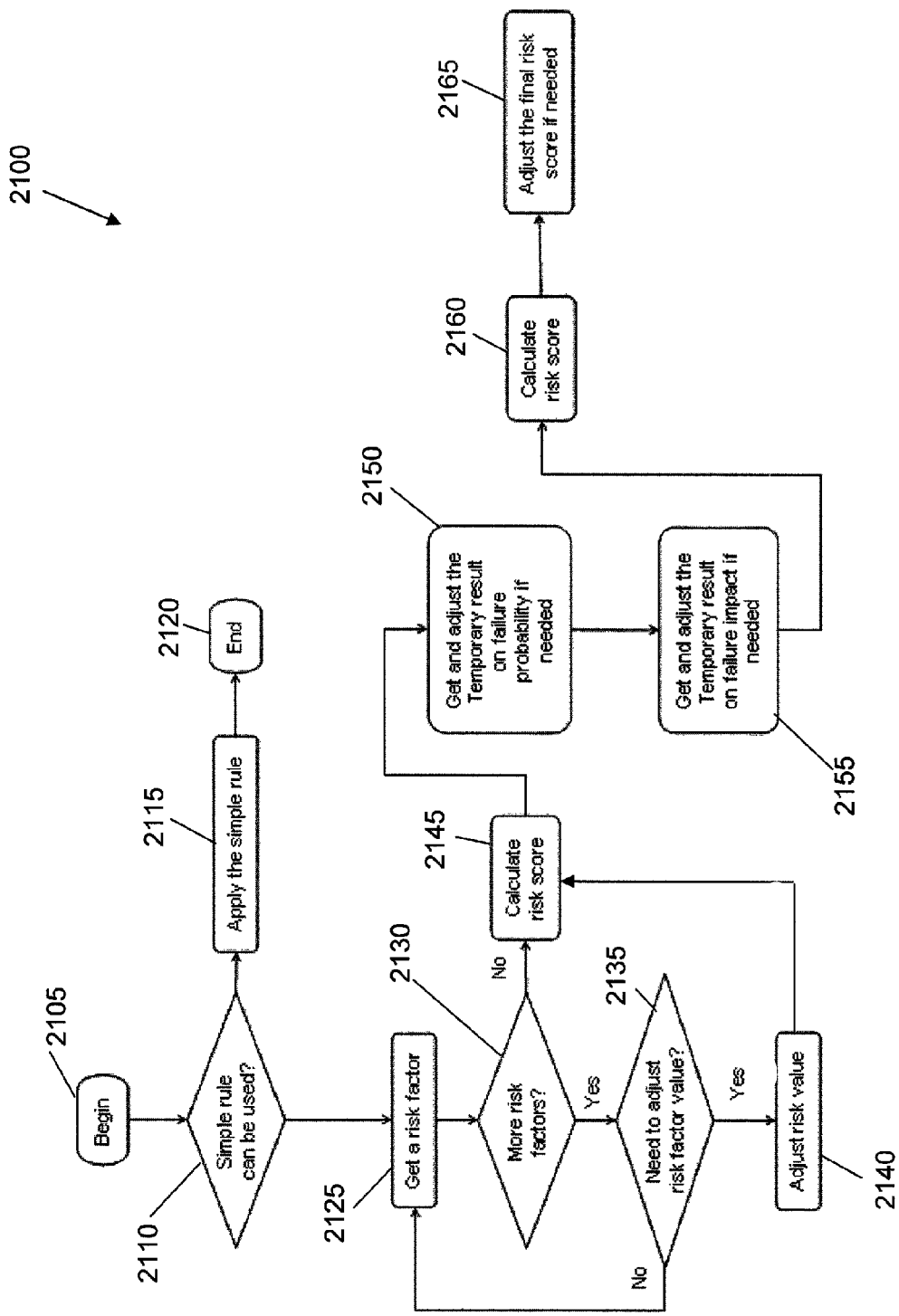
FIG. 21 shows an exemplary flow diagram or performing aspects of the present invention.

FIG. 21 shows an exemplary flow diagram 2100 for performing risk updates. In embodiments, the risk evaluation update (REU) tool is operable to update the risk evaluation based on the results of the risk-based testing. As shown in FIG. 2100, at step 2105 the process begins. At step 2110, a user or process (e.g., the REU tool) determines whether a "simple" rule may be used (for example, as shown in TABLE 1 above). If, at step 2110, a user or process (e.g., the REU tool) determines that a "simple" rule may be used, at step 2115, the REU tool applies the simple rule, and at step 2120, the process ends. If, at step 2110, a user or process (e.g., the REU tool) determines that a "simple" rule may not be used, at step 2125, a risk factor is determined. At step 2130, a user or process (e.g., the REU tool) determines whether there are more risk factors. If, at step 2130, the user or process (e.g., the REU tool) determines that there are more risk factors, the process proceeds to step 2135. At step 2135, a user (or the REU tool) determines whether the risk factor value should be adjusted. If, at step 2135, a user or process (e.g., the REU tool) determines that the risk factor value should be adjusted, at step 2140, the user (or REU tool) adjusts the risk value, and the process proceeds to step 2145. If, at step 2135, a user determines that the risk factor value should not be adjusted, the process proceeds to step 2125.

If, at step 2130, the user or process (e.g., the REU tool) determines that there are no more risk factors, the process proceeds to step 2145. At step 2145, the REU tool calculates a risk score (e.g., a temporary risk score), for example, as explained above with reference to FIG. 12. At step 2150, a user (or REU tool) receives and adjusts the temporary risk score on failure probability, if necessary. At step 2155, a user (or REU tool) receives and adjusts the temporary risk score on failure impact, if necessary. At step 2160, the REU tool calculates a risk score (e.g., a final risk score). At step 2165, the user (or REU tool) adjusts the risk score (e.g., a final risk score) if necessary.

In accordance with aspects of the invention, the subsequent test activity will be planned based on the updated/latest risk evaluation. That is, risk-based testing is a dynamic process. For example, as the testing process proceeds, the risk evaluation for these contexts may be updated, until finally the last risk evaluation is executed, e.g., for delivery into production. While explained above with reference to the exemplary flow diagram 2100, the invention contemplates other risk calculation (mapping) methods (e.g., rule-based, formula-based, or another basis).

Thus, the present invention provides the ability to evaluate risk on software in a systematic way for optimizing testing that works across any kind of project regardless of size, complexity, platform, etc. Additionally, the present invention provides a system and method for dynamically updating risk as, for example, project requirements change, with the use of actual test results as feedback to adjust and tune the risk value throughout the life cycle.

Executing Risk Model

Update Risk Model

In accordance with additional aspects of the invention, after a round of testing is completed, and a risk update is performed, the user (or an expert system) has an opportunity to think it over based on the past test experience. For example, a risk model update (RMU) tool 60 is operable to enable scrutiny, retrospection and/or improvements the risk model (e.g., as determined by the RFR tool 25, the CR tool 30, and/or the mapping tool 35). In embodiments, the RMU tool 60 is operable to, for example, add and/or delete risk factors, context, and/or mapping. In embodiments, as explained below, after a round of testing is completed, and risk evaluation update is performed (e.g., using the REU tool 55), a user may utilize the RMU tool 60 to implement scrutiny, retrospection and/or improvements the risk model based on the past test experience.

For example, a user may determine whether there is anything (e.g., risk factors) that can be improved. Such a determination may include, for example, whether all the existing risk factors are proving to be useful in influencing the risk of each associated context and/or whether there any existing risk factor that has not proved to be significant. If it is true, for example, that an existing risk factor has not proved to be too significant, a risk model update may include reducing the weight of the less significant risk factor in calculating the risk score. Additionally, such a determination of possible improvements may include determining whether any new risk factor should be added and whether any context that is ignored would valuable in risk evaluation. If it is true, for example, that an ignored context would be valuable in risk evaluation, a risk model update may include add the ignored context to the context hierarchy. Furthermore, such a determination of possible improvements may include determining whether all existing mapping definitions are correct.

Although updating the risk model is a valuable step, updating the risk model is not necessary for each round of testing. For example, when the initial risk model is mature enough updating the risk model is not necessary for each round of testing. In contrast, when a risk model is defined for the first time, the risk model is very preliminary and may need to undergo significant updating of improvement from actual use in practice. Gradually, through an iterative update process, the risk model will become more and more mature. In accordance with aspects of the invention, the mature risk model can then be saved and re-used in other projects.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims, if applicable, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principals of the invention and the practical application, and to enable others of ordinary skill in the art to understand the invention for various embodiments with various modifications as are suited to the particular use contemplated. Accordingly, while the invention has been described in terms of embodiments, those of skill in the art will recognize that the invention can be practiced with modifications and in the spirit and scope of the appended claims.

What is claimed is:

1. A method implemented in a computer infrastructure having computer executable code tangibly embodied on a computer readable storage medium having programming instructions operable to:
   receive one or more risk factors;
   receive one or more contexts and identify one or more context relationships;
   associate the one or more contexts with the one or more risk factors;
   map the one or more risk factors for an associated context to a software defect related risk consequence to determine a risk model, wherein the mapping is implemented using a processor of the computer infrastructure and comprises:
      determining a relative weight for relevant risk factors;
      determining a weighted sum of the relevant risk factors of a context for failure damage risk factors;
      determining a weighted sum of the relevant risk factors of the context for failure possibility risk factors; and
      calculating a product of the weighted sum of the relevant risk factors for failure damage risk factors and the weighted sum of the relevant risk factors for failure possibility risk factors to determine an overall risk for the context; and
   execute a risk-based testing based on the risk model to determine a defect related risk evaluation for a software development project.

2. The method of claim 1, wherein the one or more risk factors is an orthogonal list of risk factors.

3. The method of claim 1, wherein the one or more risk factors comprise at least one of technical risk factors, business risk factors and project management risk factors.

4. The method of claim 1, wherein the one or more risk factors comprises user-added risk factors.

5. The method of claim 1, wherein the one or more risk factors are defined with one or more of a risk factor name, a risk factor category, a requirement type, a description, one or more scale definitions and a risk factor value.

6. The method of claim 5, further comprising determining the risk factor value by at least one of measuring directly, calculating from risk sub factor values and using a questionnaire.

7. The method of claim 1, further comprising refactoring the one or more risk factors to achieve an orthogonal list of risk factors by at least one of merging risk factors, deleting a risk factor, splitting risk factors and adding the risk factor.

8. The method of claim 1, wherein the identifying the one or more contexts comprise at least one of a top-down approach and a bottom-up approach.

9. The method of claim 1, wherein the identifying the one or more context relationships comprises identifying one or more aggregate context relationships and one or more implementation context relationships.

10. The method of claim 1, wherein the associating the one or more contexts with the one or more risk factors comprises, for each of the one or more risk factors identifying contexts from the one or more contexts for which the one or more risk factors are applicable.

11. The method of claim 1, wherein the mapping further comprises determining a dimension where the one or more risk factors generates a risk impact.

12. The method of claim 11, wherein the dimension comprises at least one of:
   a failure possibility dimension, which indicates a likelihood that a defect will occur within a specific context; and
   a failure damage dimension, which indicates a consequence of an occurrence of the defect in production.

13. The method of claim 1, wherein the mapping further comprises receiving mapping rules as if-then rules.

14. The method of claim 1, wherein the executing the risk-based testing is performed for each stage in a software development lifecycle.

15. The method of claim 1, wherein the executing the risk-based testing comprises:
   breaking down software into risk evaluation units;
   evaluating and annotating a software solution with selected risk factors for the risk evaluation units;
   performing the risk-based testing on the software from one or more dimensions,
   collecting test results and a test process from the risk-based testing; and
   updating the defect related risk evaluation.

16. The method of claim 15, further comprising updating the risk model including at least one of altering a relative weight of a risk factor, adding a new risk factor, adding or removing a context and altering one or more mapping definitions.

17. The method of claim 1, wherein a service provider at least one of creates, maintains, deploys and supports the computer infrastructure.

18. The method of claim 1, wherein the programming instructions are provided by a service provider on a subscription, advertising, and/or fee basis.

19. A system implemented in hardware, comprising:
   a risk factor receiving (RFR) tool operable to receive one or more risk factors;
   a context receiving (CR) tool operable to receive:
      one or more contexts;
      one or more context relationships; and
      associations of the one or more contexts with the one or more risk factors;
   a mapping tool operable to map the one or more risk factors for an associated context to a software defect related risk consequence to determine a risk model, wherein the mapping comprises:
      determining a relative weight for relevant risk factors;
      determining a weighted sum of the relevant risk factors of a context for failure damage risk factors;
      determining a weighted sum of the relevant risk factors of the context for failure possibility risk factors; and calculating a product of the weighted sum of the relevant risk factors for failure damage risk factors and the weighted sum of the relevant risk factors for failure possibility risk factors to determine an overall risk for the context;

a software break-down (SB) tool operable to break-down software into risk evaluation units;

a risk annotation tool operable to evaluate and annotate a software solution with selected risk factors for the risk evaluation units; and a risk-based testing tool operable to execute a risk-based testing on the software based on the risk model to determine a defect related risk evaluation for a software development project and collect test results and a test process from the risk-based testing.

20. The system of claim 19, further comprising at least one of:

a risk evaluation update (REU) tool operable to update the defect related risk evaluation; and a risk model update (RMU) tool operable to update the risk model by at least one of altering a relative weight of a risk factor, adding a new risk factor, adding or removing a context and altering one or more mapping definitions.

21. The system of claim 19, wherein the one or more risk factors:

comprise an orthogonal list of risk factors, including at least one of technical risk factors, business risk factors, project management risk factors and user-added risk factors; and are defined with one or more of a risk factor name, a risk factor category, a requirement type, a description, one or more scale definitions and a risk factor value.

22. The system of claim 19, wherein the mapping further comprises determining a dimension where the one or more risk factors generates a risk impact, wherein the dimension comprises at least one of:

a failure possibility dimension, which indicates a likelihood that a defect will occur within a specific context; and a failure damage dimension, which indicates a consequence of an occurrence of the defect in production.

23. A computer program product comprising a computer usable storage device having readable program code embodied in the storage device, the computer program product includes at least one component operable to:

receive one or more risk factors, wherein the one or more risk factors:

comprise an orthogonal list of risk factors, including at least one of technical risk factors, business risk factors, project management risk factors and user-added risk factors; and are defined with one or more of a risk factor name, a risk factor category, a requirement type, a description, one or more scale definitions and a risk factor value;

receive one or more contexts and identify one or more context relationships;

associate the one or more contexts with the one or more risk factors;

map the one or more risk factors for an associated context to a software defect related risk consequence to determine a risk model, wherein the mapping comprises:

determining a relative weight for relevant risk factors;

determining a weighted sum of the relevant risk factors of a context for failure damage risk factors;

determining a weighted sum of the relevant risk factors of the context for failure possibility risk factors; and calculating a product of the weighted sum of the relevant risk factors for failure damage risk factors and the weighted sum of the relevant risk factors for failure possibility risk factors to determine an overall risk for the context; and execute a risk-based testing based on the risk model to determine a defect related risk evaluation for a software development project.

24. A computer system for classifying automated code inspection services defect output for defect analysis, the system comprising:

a CPU, a computer readable memory and a computer readable storage media;

first program instructions to receive one or more risk factors;

second program instructions to receive one or more contexts and identify one or more context relationships;

third program instructions to associate the one or more contexts with the one or more risk factors;

fourth program instructions to map the one or more risk factors for an associated context to a software defect related risk consequence to determine a risk model, wherein the mapping comprises:

determining a dimension where the one or more risk factors generates a risk impact, wherein the dimension comprises at least one of:

a failure possibility dimension, which indicates a likelihood that a defect will occur within a specific context; and a failure damage dimension, which indicates a consequence of an occurrence of the defect in production; and determining a relative weight for relevant risk factors;

determining a weighted sum of the relevant risk factors of a context for failure damage risk factors;

determining a weighted sum of the relevant risk factors of the context for failure possibility risk factors; and calculating a product of the weighted sum of the relevant risk factors for failure damage risk factors and the weighted sum of the relevant risk factors for failure possibility risk factors to determine an overall risk for the context; and fifth program instructions to execute a risk-based testing based on the risk model to determine a defect related risk evaluation for a software development project, wherein the first, second, third, fourth and fifth program instructions are stored on the computer readable storage media for execution by the CPU via the computer readable memory.

* * * * *